(12) United States Patent
Liu et al.

(10) Patent No.: US 12,513,667 B2
(45) Date of Patent: Dec. 30, 2025

(54) METHOD AND APPARATUS FOR NODE USED FOR WIRELESS COMMUNICATION

(71) Applicant: Quectel Wireless Solutions Co., Ltd., Shanghai (CN)

(72) Inventors: Zheng Liu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 466 days.

(21) Appl. No.: 18/064,740

(22) Filed: Dec. 12, 2022

(65) Prior Publication Data

US 2023/0111152 A1  Apr. 13, 2023

Related U.S. Application Data

(63) Continuation of application No. PCT/CN2021/089171, filed on Apr. 23, 2021.

(30) Foreign Application Priority Data

Jul. 21, 2020 (CN) .......................... 202010703692.1

(51) Int. Cl.
*H04W 72/044* (2023.01)

(52) U.S. Cl.
CPC ................................. *H04W 72/044* (2013.01)

(58) Field of Classification Search
CPC .... H04W 72/044; H04W 72/02; H04W 72/40
See application file for complete search history.

(56) References Cited

U.S. PATENT DOCUMENTS

2018/0049241 A1* 2/2018 Heo .................. H04W 74/0808
2020/0252806 A1* 8/2020 Yerramalli .......... H04L 27/0006
2020/0412504 A1* 12/2020 Wu .......................... H04B 7/08

FOREIGN PATENT DOCUMENTS

| CN | 107888256 A | 4/2018 |
| CN | 110120860 A | 8/2019 |
| CN | 112423318 A | 2/2021 |
| EP | 3214890 A1 | 9/2017 |

(Continued)

OTHER PUBLICATIONS

European Search Report issued in counterpart European Patent Application No. EP 21847310.6, dated Oct. 11, 2023.

(Continued)

*Primary Examiner* — Derrick V Rose
(74) *Attorney, Agent, or Firm* — Westbridge IP LLC

(57) ABSTRACT

Disclosed are a method and an apparatus for a node used for wireless communication. The method includes: receiving, by a first node, a first information block, where the first information block is used to indicate a first time-frequency resource block; performing first access detection in a first sub-band, where the first access detection includes more than one time of first type monitoring; and sending a first signal in the first time-frequency resource block when a quantity of times of the first type monitoring, in the first access detection, with monitoring results indicating that a channel is idle is not less than Q1; or abstaining from sending of a first signal in the first time-frequency resource block when a quantity of times of the first type monitoring, in the first access detection, with monitoring results indicating that a channel is idle is less than Q1.

18 Claims, 13 Drawing Sheets

(56) References Cited

FOREIGN PATENT DOCUMENTS

| WO | 2019126939 A1 | 7/2019 |
| WO | 2019195465 A1 | 10/2019 |

OTHER PUBLICATIONS

ZTE et al., R1-1909974 Discussion on channel access procedure for NR-U, 3GPP tsg_ranlwg1, dated Oct. 7, 2019.
First Office Action issued in counterpart Chinese Patent Application No. 202010703692.1, dated Aug. 8, 2021.
Intel Corporation, Channel access mechanism for NR-unlicensed, 3GPP TSG RAN WG1 Meeting #98bis R1-1910640, dated Oct. 8, 2019.
International Search Report issued in corresponding PCT Application No. PCT/CN2021/089171, dated Jul. 14, 2021.
Written Opinion issued in corresponding PCT Application No. PCT/CN2021/089171, dated Jul. 14, 2021.

* cited by examiner

METHOD AND APPARATUS FOR NODE USED FOR WIRELESS COMMUNICATION

CROSS-REFERENCE TO RELATED APPLICATIONS

This application is a continuation of International Application No. PCT/CN2021/089171, filed on Apr. 23, 2021, which claims priority to Chinese Patent Application No. 202010703692.1, filed on Jul. 21, 2020. The disclosures of the aforementioned applications are hereby incorporated by reference in their entireties.

TECHNICAL FIELD

The present application relates to a transmission method and apparatus in a wireless communications system, and in particular, to a transmission solution and apparatus related to an unlicensed spectrum in wireless communication.

BACKGROUND

Application scenarios of a future wireless communications system are increasingly diversified, and different application scenarios impose different performance requirements on the system. To meet the different performance requirements of various application scenarios, at the 3rd Generation Partnership Project (3GPP) Radio Access Network (RAN) #72 plenary meeting, the New Radio (NR) (or Fifth Generation (5G)) technology was decided to be studied, and at the 3GPP RAN #75 plenary meeting, the Work Item (WI) of NR was approved and standardization of NR was started.

A key technology of NR is to support beam-based signal transmission. A main application scenario of the technology is to enhance coverage of NR devices operating in a millimeter-wave frequency band (for example, a frequency band above 6 GHz). In addition, a beam-based transmission technology is also needed in a low frequency band (for example, a frequency band below 6 GHz) to support massive antennas. Based on weighting processing performed on an antenna array, a radio frequency signal forms a relatively strong beam in a specific spatial direction, but the signal is relatively weak in other directions. After operations such as beam measurement and beam feedback, a beam of a transmitting set and a beam of a receiving set may be accurately aligned with each other, so that a signal is sent and received with relatively strong power, thereby improving coverage performance. Beam measurement and feedback of an NR system operating in a millimeter-wave frequency band may be implemented by using a plurality of synchronization broadcast signal blocks (SS/PBCH block, (SSB)) and a plurality of channel state information-reference signals (CSI-RS). Different SSBs or CSI-RSs may be transmitted by using different beams. User equipment (UE) implements beam alignment by measuring an SSB or a CSI-RS sent by a next generation Node B (gNB) and feeding back an SSB index or a CSI-RS resource number.

In a traditional cellular system, data transmission can occur only on a licensed spectrum. However, with the rapid increase of a service volume, especially in some urban areas, the licensed spectrum may fail to satisfy a requirement of the service volume. 3GPP Release 17 considers extending application of NR to an unlicensed spectrum above 52.6 GHz. To ensure compatibility with other access technologies on the unlicensed spectrum, a Listen Before Talk (LBT) technology is used to avoid interference caused when a plurality of transmitting sets occupy a same frequency resource. For an unlicensed spectrum above 52.6 GHz, beam-based signal transmission is obviously directional, and thus a directional LBT technology is more suitable to be used to avoid interference.

In category 4 LBT (Cat 4 LBT, referring to 3GPP TR36.889) procedures of LTE and NR, a transmitting set (a base station or user equipment) first performs energy detection in a defer duration. If a result of the detection indicates that a channel is idle, backoff needs to be performed, and energy detection is performed during the backoff. Time of the backoff is counted by using a clear channel assessment (CCA) slot duration as a unit. A quantity of slot durations of the backoff is obtained by the transmitting set via random selection in a contention window size (CWS). Therefore, a duration period of Cat 4 LBT is uncertain. Category 2 LBT (Cat 2 LBT, referring to 3GPP TR36.889) is another type of LBT. Cat 2 LBT determines whether a channel is idle by evaluating strength of energy in a specific period of time. A duration period of Cat 2 LBT is certain. NR uses a similar mechanism. When being used for downlink, Cat 4 LBT is also referred to as a Type 1 downlink channel access procedure. When being used for uplink, Cat 4 LBT is also referred to as a Type 1 uplink channel access procedure. When being used for downlink, Cat 2 LBT is also referred to as a Type 2 downlink channel access procedure. When being used for uplink, Cat 2 LBT is also referred to as a Type 2 uplink channel access procedure. For specific definitions, reference may be made to 3GPP TS37.213. Cat 4 LBT in the present application is also used to represent a Type 1 downlink channel access procedure or a Type 1 uplink channel access procedure. Cat 2 LBT in the present application is also used to represent a Type 2 downlink channel access procedure or a Type 2 uplink channel access procedure.

For omni directional LBT or quasi-omni directional LBT, when LBT succeeds, a node may send a wireless signal in any direction. For directional LBT, when LBT succeeds, only a wireless signal in a direction same as that of the directional LBT can be sent. However, the omni directional LBT or quasi-omni directional LBT is impacted by wireless signals in all directions, while the directional LBT is impacted only by wireless signals in some directions. Therefore, the directional LBT is easier to succeed. In the present application, "LBT succeeds" is used to indicate that a result of LBT is a channel being idle; and "LBT fails" is used to indicate that a result of LBT is a channel being busy.

SUMMARY

The inventors find through research that a directional LBT technology helps improve spectrum reuse efficiency and transmission performance of an NR system operating on an unlicensed spectrum. However, different from omni directional LBT or quasi-omni directional LBT, after directional LBT succeeds, signal transmission can be performed only in a beam direction where the LBT succeeds, but is limited in a direction where the directional LBT is not performed or fails. Therefore, how to make full use of advantages of directional LBT and omni directional LBT/quasi-omni directional LBT is a problem to be resolved.

The present application provides a solution to the foregoing problem. It should be noted that, although the foregoing description uses, as an example, a scenario in which transmission is performed through an air interface between a gNB and UE in a cellular network on an unlicensed spectrum, the present application is also applicable to other communication scenarios (such as a wireless local area network scenario, and a sidelink transmission scenario between user equipment and user equipment), and to a licensed spectrum, and can obtain a similar technical effect. In addition, using a unified solution for different scenarios (including but are not limited to a cellular network, a wireless local area network, sidelink transmission, a licensed spectrum, and an unlicensed spectrum) also helps reduce hardware complexity and costs. On the premise of no conflict, an embodiment and features in the embodiment of a first node of the present application may be applied to a second node, and vice versa. On the premise of no conflict, the embodiments in the present application and features in the embodiments may be arbitrarily combined with each other.

In an embodiment, for explanation of terminology in the present application, reference is made to the definitions in 3GPP TS36 series.

In an embodiment, for explanation of terminology in the present application, reference is made to the definitions in 3GPP TS38 series.

In an embodiment, for explanation of terminology in the present application, reference is made to the definitions in 3GPP TS37 series.

In an embodiment, for explanation of terminology in the present application, reference is made to the definitions in specification protocols of Institute of Electrical and Electronics Engineers (IEEE).

The present application discloses a method for a first node used for wireless communication, including:

receiving a first information block, where the first information block is used to indicate a first time-frequency resource block;

performing first access detection in a first sub-band, where the first access detection includes more than one time of first type monitoring; and sending a first signal in the first time-frequency resource block when a quantity of times of the first type monitoring, in the first access detection, with monitoring results indicating that a channel is idle is not less than Q1; or abstaining from sending of a first signal in the first time-frequency resource block when a quantity of times of the first type monitoring, in the first access detection, with monitoring results indicating that a channel is idle is less than Q1.

An end time of the first access detection is not later than a start time of the first time-frequency resource block, the monitoring result of one time of the first type monitoring includes a channel being idle or a channel being busy, and Q1 is a positive integer; the first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1.

In an embodiment, a characteristic of the foregoing method includes that: the first access detection includes one Cat 4 LBT procedure; the first type monitoring includes one time of energy detection in a slot duration; and the first multi-antenna relevant parameter and the second multi-antenna relevant parameter respectively correspond to two different receive beams.

In an embodiment, a benefit of the foregoing method includes that: in one procedure of Cat 4 LBT, a multi-antenna relevant parameter used for the LBT may be changed before the LBT is completed (that is, changed before one of a plurality of times of energy detection included by the Cat 4 LBT), instead of being changed after the LBT is completed or fails. This increases flexibility of directional LBT, and can increase a success probability of LBT.

According to an aspect of the present application, a characteristic of the foregoing method includes that: a first power threshold is associated with the first multi-antenna relevant parameter and used to determine the monitoring results of the Q2 times of first type monitoring; a second power threshold is associated with the second multi-antenna relevant parameter and used to determine the monitoring results of the Q3 times of first type monitoring; and the second power threshold is not less than the first power threshold.

In an embodiment, a characteristic of the foregoing method includes that: since different multi-antenna relevant parameters correspond to different beam gains, transmit power, interference ranges, and interference degrees, a power threshold used for energy detection is related to a multi-antenna relevant parameter, and different multi-antenna relevant parameters may correspond to different power thresholds.

In an embodiment, a characteristic of the foregoing method includes that: for energy detection, a lower power threshold leads to a higher requirement for the energy detection (that is, in a case that other conditions are unchanged, it is harder for the energy detection to succeed). If the second power threshold is equal to or greater than the first power threshold, in a case that other conditions are unchanged, a result of energy detection performed based on the first power threshold is also valid to energy detection performed based on the second power threshold (that is, the result is the same as a result of the energy detection performed based on the second power threshold). On the contrary, if the second power threshold is less than the first power threshold, in a case that other conditions are unchanged, a result of energy detection performed based on the first power threshold is invalid to energy detection performed based on the second power threshold (that is, the result may be different from a result of the energy detection performed based on the second power threshold).

In an embodiment, a benefit of the foregoing method includes that: since the second power threshold is not less than the first power threshold, after changing to the second multi-antenna relevant parameter during energy detection, a requirement for the energy detection does not become higher. Therefore, a result of Q2 times of energy detection performed before the changing is still valid. This helps guarantee accuracy of first access detection and fairness of contention access on an unlicensed spectrum.

According to an aspect of the present application, a characteristic of the foregoing method includes that: the second multi-antenna relevant parameter is spatially associated with the first multi-antenna relevant parameter.

In an embodiment, a characteristic of the foregoing method includes that: the first multi-antenna relevant parameter and the second multi-antenna relevant parameter respectively include a first receive beam and a second receive beam.

In an embodiment, a characteristic of the foregoing method includes that: the sentence that "the second multi-antenna relevant parameter is spatially associated with the first multi-antenna relevant parameter" includes a spatial direction of the first receive beam containing a spatial direction of the second receive beam. This means that if no signal of an interference node exists in the spatial direction of the first receive beam, no signal of an interference node exists in the spatial direction of the second receive beam.

In an embodiment, a benefit of the foregoing method includes that: the second receive beam can be used to perform the Q3 times of first type monitoring only when the spatial direction of the first receive beam contains the spatial direction of the second receive beam, thereby avoiding interference in a spatial direction where energy detection is not performed.

In an embodiment, a monitoring result of the last one of the Q2 times of first type monitoring indicates that a channel is busy.

In an embodiment, a benefit of the foregoing method includes that: when a monitoring result of one of the more than one time of first type monitoring (namely, the last one of the Q2 times of first type monitoring) indicates that a channel is busy, the first node switches the first receive beam that is wider with the second receive beam that is narrower to perform subsequent first type monitoring. This helps improve a success rate of the first access detection.

According to an aspect of the present application, a characteristic of the foregoing method includes that: a multi-antenna relevant parameter of the first signal is used to determine the second multi-antenna relevant parameter.

According to an aspect of the present application, a characteristic of the foregoing method includes that: a priority parameter of the first signal is used to determine Q1.

According to an aspect of the present application, a characteristic of the foregoing method includes that: the first signal includes a second information block; and the second information block is used to indicate that the second multi-antenna relevant parameter is used in the first access detection.

According to an aspect of the present application, a characteristic of the foregoing method includes that: the monitoring results of the Q3 times of first type monitoring are used to determine, from the first multi-antenna relevant parameter and the second multi-antenna relevant parameter, a multi-antenna relevant parameter for performing remaining times of first type monitoring, in the first access detection, other than the Q2 times of first type monitoring and the Q3 times of first type monitoring.

The present application discloses a method for a second node used for wireless communication, including:
sending a first information block, where the first information block is used to indicate a first time-frequency resource block; and
monitoring a first signal in the first time-frequency resource block, where first access detection performed in a first sub-band is used to determine whether the first signal is sent; the first access detection includes more than one time of first type monitoring; the first signal is sent in the first time-frequency resource block when a quantity of times of the first type monitoring, in the first access detection, with monitoring results indicating that a channel is idle is not less than Q1; or the first signal is not sent in the first time-frequency resource block when a quantity of times of the first type monitoring, in the first access detection, with monitoring results indicating that a channel is idle is less than Q1.

An end time of the first access detection is not later than a start time of the first time-frequency resource block, the monitoring result of one time of the first type monitoring includes a channel being idle or a channel being busy, and Q1 is a positive integer; the first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1.

According to an aspect of the present application, a characteristic of the foregoing method includes that: a first power threshold is associated with the first multi-antenna relevant parameter and used to determine the monitoring results of the Q2 times of first type monitoring; a second power threshold is associated with the second multi-antenna relevant parameter and used to determine the monitoring results of the Q3 times of first type monitoring; and the second power threshold is not less than the first power threshold.

According to an aspect of the present application, a characteristic of the foregoing method includes that: the second multi-antenna relevant parameter is spatially associated with the first multi-antenna relevant parameter.

According to an aspect of the present application, a characteristic of the foregoing method includes that: a multi-antenna relevant parameter of the first signal is used to determine the second multi-antenna relevant parameter.

According to an aspect of the present application, a characteristic of the foregoing method includes that: a priority parameter of the first signal is used to determine Q1.

According to an aspect of the present application, a characteristic of the foregoing method includes that: the first signal includes a second information block; and the second information block is used to indicate that the second multi-antenna relevant parameter is used in the first access detection.

According to an aspect of the present application, a characteristic of the foregoing method includes that: the monitoring results of the Q3 times of first type monitoring are used to determine, from the first multi-antenna relevant parameter and the second multi-antenna relevant parameter, a multi-antenna relevant parameter for performing remaining times of first type monitoring, in the first access detection, other than the Q2 times of first type monitoring and the Q3 times of first type monitoring.

The present application discloses a first node used for wireless communication, including:
a first receiving set, configured to receive a first information block, where the first information block is used to indicate a first time-frequency resource block; and
the first receiving set is configured to perform first access detection in a first sub-band, where the first access detection includes more than one time of first type monitoring; and
a first transmitting set, configured to: send a first signal in the first time-frequency resource block when a quantity of times of the first type monitoring, in the first access detection, with monitoring results indicating that a channel is idle is not less than Q1; or abstaining from sending of a first signal in the first time-frequency resource block when a quantity of times of the first type monitoring, in the first access detection, with monitoring results indicating that a channel is idle is less than Q1.

An end time of the first access detection is not later than a start time of the first time-frequency resource block, the monitoring result of one time of the first type monitoring includes a channel being idle or a channel being busy, and Q1 is a positive integer; the first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1.

The present application discloses a second node used for wireless communication, including:

a second transmitting set, configured to send a first information block, where the first information block is used to indicate a first time-frequency resource block; and a second receiving set, configured to monitor a first signal in the first time-frequency resource block, where first access detection performed in a first sub-band is used to determine whether the first signal is sent; the first access detection includes more than one time of first type monitoring; the first signal is sent in the first time-frequency resource block when a quantity of times of the first type monitoring, in the first access detection, with monitoring results indicating that a channel is idle is not less than Q1; or the first signal is not sent in the first time-frequency resource block when a quantity of times of the first type monitoring, in the first access detection, with monitoring results indicating that a channel is idle is less than Q1.

An end time of the first access detection is not later than a start time of the first time-frequency resource block, the monitoring result of one time of the first type monitoring includes a channel being idle or a channel being busy, and Q1 is a positive integer; the first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1.

In an embodiment, the present application has the following advantages:

For an LBT procedure containing a plurality of times of energy detection, a multi-antenna relevant parameter used for performing energy detection may be switched during LBT, instead of being switched after the LBT is completed. This enhances flexibility of LBT and improves a success probability of LBT.

For an LBT procedure containing a plurality of times of energy detection, a multi-antenna relevant parameter can be changed only to a multi-antenna relevant parameter associated with a same or higher detection threshold to perform energy detection, thereby guaranteeing fairness of contention access on an unlicensed spectrum.

For an LBT procedure containing a plurality of times of energy detection, when a result of at least one time of energy detection indicates that a channel is busy, switching to a narrower receive beam may be performed to continue performing remaining energy detection, thereby helping improve a success rate of LBT.

BRIEF DESCRIPTION OF THE DRAWINGS

Other features, objectives, and advantages of the present application will become more apparent upon reading the detailed description of the non-restrictive embodiments with reference to the accompanying drawings.

DETAILED DESCRIPTION OF THE EMBODIMENTS

The technical solutions of the present application are further described in detail below with reference to the accompanying drawings. It should be noted that, in the case of no conflict, the embodiments of the present application and characteristics in the embodiments may be arbitrarily combined with each other.

Embodiment 1

Figure 1:
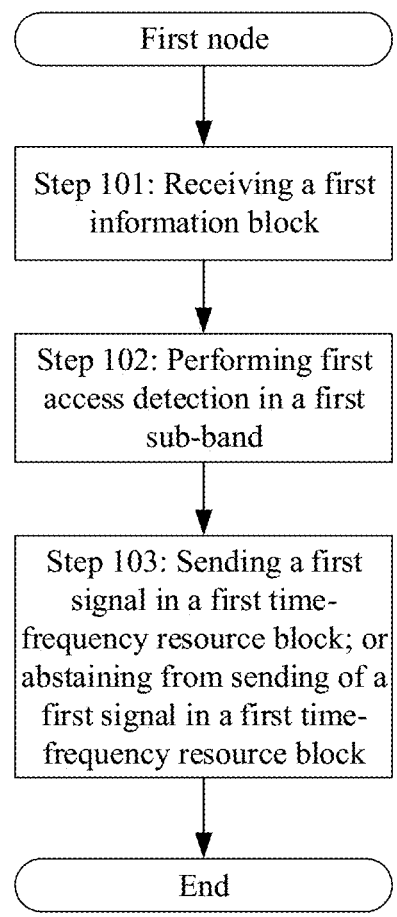
FIG. 1 is a processing flowchart of a first node according to an embodiment of the present application.

Embodiment 1 illustrates a processing flowchart of a first node according to an embodiment of the present application, as shown in FIG. 1. In FIG. 1, each block denotes a step. In particular, a sequence of steps in the blocks does not represent a specific temporal sequence relationship. In Embodiment 1, the first node in the present application receives a first information block in Step 101; performs first access detection in a first sub-band in Step 102; and sends a first signal in a first time-frequency resource block or abstains from sending of the first signal in the first time-frequency resource block in Step 103. The first information block is used to indicate a first time-frequency resource block. The first access detection includes more than one time of first type monitoring. The first signal is sent in the first time-frequency resource block when a quantity of times of the first type monitoring, in the first access detection, with monitoring results indicating that a channel is idle is not less than Q1. Sending of the first signal is abstained from in the first time-frequency resource block when a quantity of times of the first type monitoring, in the first access detection, with monitoring results indicating that a channel is idle is less than Q1. An end time of the first access detection is not later than a start time of the first time-frequency resource block, the monitoring result of one time of the first type monitoring includes a channel being idle or a channel being busy, and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, the first information block is dynamic signaling.

In an embodiment, the first information block is layer 1 (L1) signaling.

In an embodiment, the first information block is layer 1 (L1) control signaling.

In an embodiment, the first information block is cell-specific.

In an embodiment, the first information block is user group-specific.

In an embodiment, the first information block includes all or part of higher-layer signaling.

In an embodiment, the first information block includes all or part of RRC-layer signaling.

In an embodiment, the first information block includes one or more fields of an RRC IE.

In an embodiment, the first information block includes all or part of MAC-layer signaling.

In an embodiment, the first information block includes one or more fields of a MAC CE.

In an embodiment, the first information block includes one or more fields of PHY-layer signaling.

In an embodiment, the first information block is semi-statically configured.

In an embodiment, the first information block is dynamically configured.

In an embodiment, the first information block is transmitted on a sidelink.

In an embodiment, the first information block is transmitted on an uplink.

In an embodiment, the first information block is transmitted on a backhaul.

In an embodiment, the first information block is transmitted through a Uu interface.

In an embodiment, the first information block is transmitted through a PC5 interface.

In an embodiment, the first information block is transmitted via groupcast.

In an embodiment, the first information block is transmitted via broadcast.

In an embodiment, the first information block includes sidelink control information (SCI).

In an embodiment, the first information block includes one or more fields of SCI.

In an embodiment, the first information block includes one or more fields of an SCI format.

In an embodiment, the first information block includes downlink control information (DCI).

In an embodiment, the first information block includes one or more fields of DCI.

In an embodiment, the first information block includes one or more fields of a DCI format.

In an embodiment, the first information block is sent on a physical downlink shared channel (PDSCH).

In an embodiment, the first information block is sent on a physical downlink control channel (PDCCH).

In an embodiment, the first information block is sent on a physical sidelink control channel (PSCCH).

In an embodiment, the first information block is sent on a physical sidelink shared channel (PSSCH).

In an embodiment, the first information block is transmitted on a licensed spectrum.

In an embodiment, the first information block is transmitted on an unlicensed spectrum.

In an embodiment, the first information block includes at least some fields in higher-layer signaling ConfiguredGrant-Config.

In an embodiment, a name of the first information block includes ConfiguredGrant.

In an embodiment, the first information block includes a DCI format used for scheduling a physical uplink shared channel (PUSCH).

In an embodiment, the first information block includes a DCI Format 0_0.

In an embodiment, the first information block includes a DCI Format 0_1.

In an embodiment, the first information block includes a DCI Format 0_2.

In an embodiment, the first information block is scrambled by a configured scheduling-radio network temporary identifier (CS-RNTI).

In an embodiment, the first signal includes a baseband signal.

In an embodiment, the first signal includes a wireless signal.

In an embodiment, the first signal is transmitted on a sidelink.

In an embodiment, the first signal is transmitted on an uplink.

In an embodiment, the first signal is transmitted on a backhaul.

In an embodiment, the first signal is transmitted through a Uu interface.

In an embodiment, the first signal is transmitted through a PC5 interface.

In an embodiment, the first signal carries a transport block (TB).

In an embodiment, the first signal carries a code block (CB).

In an embodiment, the first signal carries a code block group (CBG).

In an embodiment, the first signal includes control information.

In an embodiment, the first signal includes SCI.

In an embodiment, the first signal includes one or more fields of SCI.

In an embodiment, the first signal includes one or more fields of an SCI format.

In an embodiment, the first signal includes uplink control information (UCI).

In an embodiment, the first signal includes one or more fields of UCI.

In an embodiment, the first signal includes one or more fields of a UCI format.

In an embodiment, the first signal includes a PUSCH.

In an embodiment, the first signal includes a physical uplink control channel (PUCCH).

In an embodiment, the first signal includes a PDSCH.

In an embodiment, the first signal includes a PSCCH.

In an embodiment, the first signal includes a PSSCH.

In an embodiment, the first signal includes a physical sidelink feedback channel (PSFCH).

In an embodiment, the first signal is transmitted on a licensed spectrum.

In an embodiment, the first signal is transmitted on an unlicensed spectrum.

In an embodiment, the first signal includes an uplink reference signal.

In an embodiment, the first signal includes a sidelink reference signal.

In an embodiment, the first signal includes a demodulation reference signal (DMRS).

In an embodiment, the first signal includes a sounding reference signal (SRS).

In an embodiment, the first signal includes a configured grant-uplink signal.

In an embodiment, the first signal includes a dynamically scheduled uplink signal.

In an embodiment, the first signal includes a semi-statically scheduled uplink signal.

In an embodiment, the first signal includes a configured grant-PUSCH (CG-PUSCH).

In an embodiment, the first signal includes a dynamically scheduled PUSCH.

In an embodiment, the first signal includes a semi-statically scheduled PUSCH.

In an embodiment, the first multi-antenna relevant parameter includes a spatial domain filter.

In an embodiment, the first multi-antenna relevant parameter includes a transmission configuration indicator (TCI).

In an embodiment, the first multi-antenna relevant parameter includes a spatial relevant parameter.

In an embodiment, the first multi-antenna relevant parameter includes a QCL parameter.

In an embodiment, the first multi-antenna relevant parameter includes a transmit beam.

In an embodiment, the first multi-antenna relevant parameter includes a receive beam.

In an embodiment, the first multi-antenna relevant parameter includes a spatial transmission filter.

In an embodiment, the first multi-antenna relevant parameter includes a spatial reception filter.

In an embodiment, the first multi-antenna relevant parameter includes a spatial relation relationship with a reference signal.

In an embodiment, the first multi-antenna relevant parameter includes a QCL relationship with a reference signal.

In an embodiment, the second multi-antenna relevant parameter includes a spatial domain filter.

In an embodiment, the second multi-antenna relevant parameter includes a TCI.

In an embodiment, the second multi-antenna relevant parameter includes a spatial relevant parameter.

In an embodiment, the second multi-antenna relevant parameter includes a QCL parameter.

In an embodiment, the second multi-antenna relevant parameter includes a transmit beam.

In an embodiment, the second multi-antenna relevant parameter includes a receive beam.

In an embodiment, the second multi-antenna relevant parameter includes a spatial transmission filter.

In an embodiment, the second multi-antenna relevant parameter includes a spatial reception filter.

In an embodiment, the second multi-antenna relevant parameter includes a spatial relation relationship with a reference signal.

In an embodiment, the second multi-antenna relevant parameter includes a QCL relationship with a reference signal.

In a sub-embodiment of the foregoing embodiment, the reference signal includes one of {an SSB, a CSI-RS, an SRS, and a DMRS}.

In an embodiment, the QCL parameter includes a QCL type.

In an embodiment, the QCL parameter includes a QCL association relationship with another signal.

In an embodiment, the QCL parameter includes a spatial relation relationship with another signal.

In an embodiment, for a specific definition of QCL, refer to section 5.1.5 of 3GPP TS38.214.

In an embodiment, a QCL association relationship between one signal and another signal is: all or some of large-scale properties of a wireless signal sent on an antenna port corresponding to the another signal can be deduced from all or some of large-scale properties of a wireless signal sent on an antenna port corresponding to the one signal.

In an embodiment, large-scale properties of a wireless signal include one or more of {a delay spread, a Doppler spread, a Doppler shift, a path loss, an average gain, an average delay, and spatial Rx parameters}.

In an embodiment, spatial Rx parameters include one or more of {a receive beam, a reception analog beamforming matrix, a reception analog beamforming vector, a receive beamforming vector, a reception spatial filter, and a spatial domain reception filter}.

In an embodiment, a QCL association relationship between one signal and another signal is: each of the one signal and the another signal includes at least one same QCL parameter.

In an embodiment, the QCL parameter includes one or more of {a delay spread, a Doppler spread, a Doppler shift, a path loss, an average gain, an average delay, and spatial Rx parameters}.

In an embodiment, a QCL association relationship between one signal and another signal is: at least one QCL parameter of the another signal can be deduced from at least one QCL parameter of the one signal.

In an embodiment, a QCL type between one signal and another signal being QCL-TypeD indicates that spatial Rx parameters of a wireless signal sent on an antenna port corresponding to the another signal can be deduced from spatial Rx parameters of a wireless signal sent on an antenna port corresponding to the one signal.

In an embodiment, a QCL type between one signal and another signal being QCL-TypeD indicates that the one reference signal and the another reference signal can be received by using a same spatial Rx parameter.

In an embodiment, a spatial relation relationship between one signal and another signal is the another signal is sent by a spatial filter receiving the one signal.

In an embodiment, a spatial relation relationship between one signal and another signal is the another signal is received by a spatial filter sending the one signal.

In an embodiment, the first time-frequency resource block includes a positive integer quantity of resource elements (REs) in frequency domain.

In an embodiment, the first time-frequency resource block includes a positive integer quantity of resource blocks (RBs) in frequency domain.

In an embodiment, the first time-frequency resource block includes a positive integer quantity of resource block groups (RBGs) in frequency domain.

In an embodiment, the first time-frequency resource block includes a positive integer quantity of control channel elements (CCEs) in frequency domain.

In an embodiment, the first time-frequency resource block includes a positive integer quantity of multi-carrier symbols in time domain.

In an embodiment, the first time-frequency resource block includes a positive integer quantity of slots in time domain.

In an embodiment, the first time-frequency resource block includes a positive integer quantity of sub-frames in time domain.

In an embodiment, the first time-frequency resource block includes a plurality of consecutive multi-carrier symbols in time domain.

In an embodiment, the first time-frequency resource block includes a plurality of consecutive resource blocks in frequency domain.

In an embodiment, the first time-frequency resource block includes a plurality of inconsecutive resource blocks in frequency domain.

In an embodiment, the first sub-band includes a positive integer quantity of RBs.

In an embodiment, the first sub-band includes a positive integer quantity of RBGs.

In an embodiment, the first sub-band includes a positive integer quantity of carrier components (CCs).

In an embodiment, the first sub-band includes a positive integer quantity of LBT channel bandwidths.

In an embodiment, the first time-frequency resource block belongs to the first sub-band in frequency domain.

In an embodiment, the first time-frequency resource block does not belong to the first sub-band in frequency domain.

In an embodiment, Q1 is equal to 1.

In an embodiment, Q1 is greater than 1.

In an embodiment, a priority parameter of the first signal is used to determine Q1.

In an embodiment, a priority parameter of the first signal is used to determine a candidate integer N1, where N1 is a positive integer. Q1 is an integer ranging from 0 to the candidate integer N1.

In an embodiment, the first node randomly determines Q1 from 0 to the candidate integer N1.

In an embodiment, a monitoring result of the last one of the Q2 times of first type monitoring indicates that a channel is busy.

In an embodiment, a quantity of times of the first type monitoring, in the Q2 times of first type monitoring, with monitoring results indicating that a channel is busy is greater than a first quantity threshold; and the first quantity threshold is a positive integer.

In an embodiment, a quantity of times of the first type monitoring, in the Q2 times of first type monitoring, with monitoring results indicating that a channel is busy is not less than a first quantity threshold; and the first quantity threshold is a positive integer.

Embodiment 2

Figure 2:
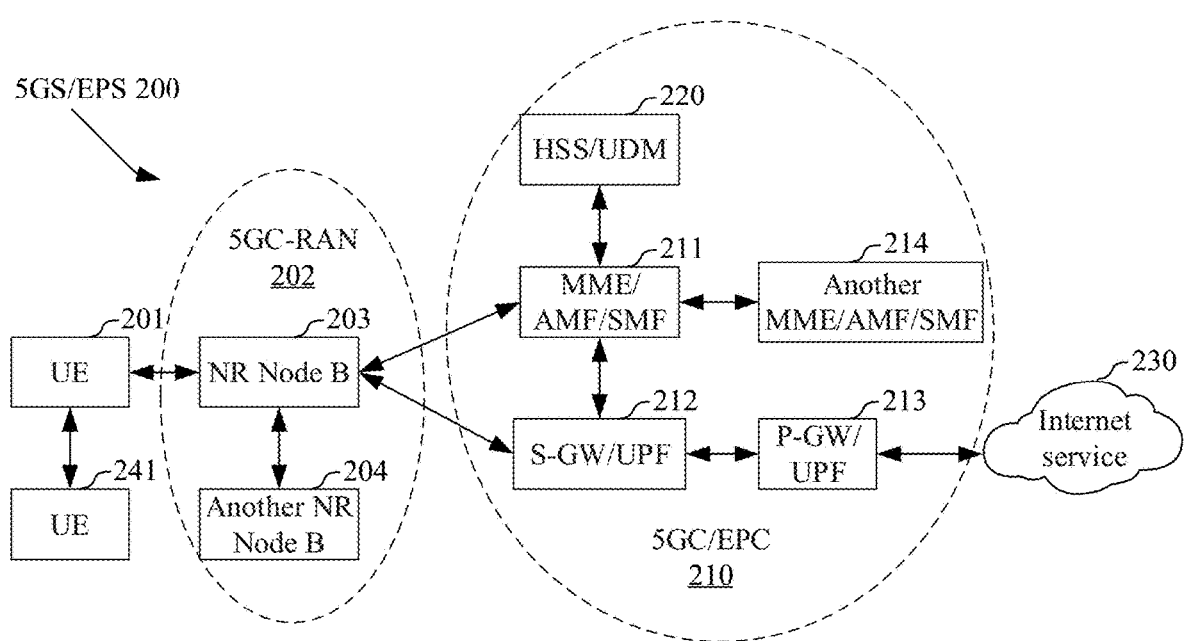
FIG. 2 is a schematic diagram of a network architecture according to an embodiment of the present application.

Embodiment 2 illustrates a schematic diagram of a network architecture according to the present application, as shown in FIG. 2.

FIG. 2 shows a diagram of a network architecture 200 of a 5G NR system, a Long-Term Evolution (LTE) system, and a Long Term Evolution-Advanced (LTE-A) system. The 5G NR or LTE network architecture 200 may be referred to as a 5G System (5GS)/an Evolved Packet System (EPS) 200 or another suitable term. The 5GS/EPS 200 may include one or more user equipments (UEs) 201, a next-generation radio access network (NG-RAN) 202, a 5G Core Network (5GC)/ an Evolved Packet Core (EPC) 210, a Home Subscriber Server (HSS)/Unified Data Management (UDM) 220, and an Internet service 230. The 5GS/EPS may interconnect with other access networks, but these entities/interfaces are not shown for simplicity. As shown in the figure, the 5GS/EPS provides a packet-switched service. However, those skilled in the art will readily understand that the various concepts presented throughout the present application may be extended to a network that provides a circuit-switched service or another cellular network. The NG-RAN includes an NR Node B (gNB) 203 and another gNB 204. The gNB 203 provides termination of a user plane protocol and a control plane protocol towards the UE 201. The gNB 203 may be connected to the another gNB 204 via an Xn interface (for example, a backhaul). The gNB 203 may also be referred to as a base station, a base transceiver station, a wireless base station, a wireless transceiver, a transceiver function, a basic service set (BSS), an extended service set (ESS), a transmission and reception point (TRP), or another suitable term. The gNB 203 provides the UE 201 with an access point to the 5GC/EPC 210. Examples of the UE 201 include a cellular phone, a smart phone, a Session Initiation Protocol (SIP) phone, a laptop computer, a personal digital assistant (PDA), a satellite radio apparatus, a non-terrestrial base station communication apparatus, a satellite mobile communications apparatus, a global positioning system, a multimedia apparatus, a video apparatus, a digital audio player (such as an MP3 player), a camera, a game console, an unmanned aerial vehicle, an aircraft, a narrowband-Internet of Things device, a machine type communications device, a land vehicle, an automobile, a wearable device, or any other similar functional apparatuses. The UE 201 may also be referred, by a person skilled in the art, to as a mobile station, a subscriber station, a mobile unit, a subscriber unit, a wireless unit, a remote unit, a mobile apparatus, a wireless apparatus, a wireless communications apparatus, a remote apparatus, a mobile subscriber station, an access terminal, a mobile terminal, a wireless terminal, a remote terminal, a handset, a user agent, a mobile client, a client, or another suitable term. The gNB 203 is connected to the 5GC/EPC 210 via an S1/NG interface. The 5GC/EPC 210 includes a Mobility Management Entity (MME)/Authentication Management Field (AMF)/Session Management Function (SMF) 211, another MME/AMF/SMF 214, a Service Gateway (S-GW)/User Plane Function (UPF) 212, and a Packet Data Network Gateway (P-GW)/UPF 213. The MME/AMF/SMF 211 is a control node that handles signaling between the UE 201 and the 5GC/EPC 210. Generally, the MME/AMF/SMF 211 provides bearing and connection management. All user Internet Protocol (IP) packets are transmitted through the S-GW/UPF 212y, and the S-GW/UPF 212 itself is connected to the P-GW/UPF 213. The P-GW provides UE IP address allocation and other functions. The P-GW/UPF 213 is connected to the Internet service 230. The Internet service 230 includes an Internet protocol service corresponding to an operator, and may specifically include an Internet service, an intranet service, an IP multimedia subsystem (IMS) service, and a packet switching streaming service.

In an embodiment, the first node in the present application includes the gNB 203.

In an embodiment, the second node in the present application includes the gNB 203.

In an embodiment, the second node in the present application includes the UE 241.

In an embodiment, the first node in the present application includes the UE 241.

In an embodiment, the second node in the present application includes the UE 201.

In an embodiment, the second node in the present application includes the gNB 204.

In an embodiment, the user equipment in the present application includes the UE 201.

In an embodiment, the user equipment in the present application includes the UE 241.

In an embodiment, the base station in the present application includes the gNB 203.

In an embodiment, the base station device in the present application includes the gNB 204.

In an embodiment, the UE 201 supports sidelink transmission.

In an embodiment, the UE 201 supports a PC5 interface.

In an embodiment, the UE 201 supports a Uu interface.

In an embodiment, the UE 241 supports sidelink transmission.

In an embodiment, the UE 241 supports a PC5 interface.

In an embodiment, the gNB 203 supports a Uu interface.

Embodiment 3

Figure 3:
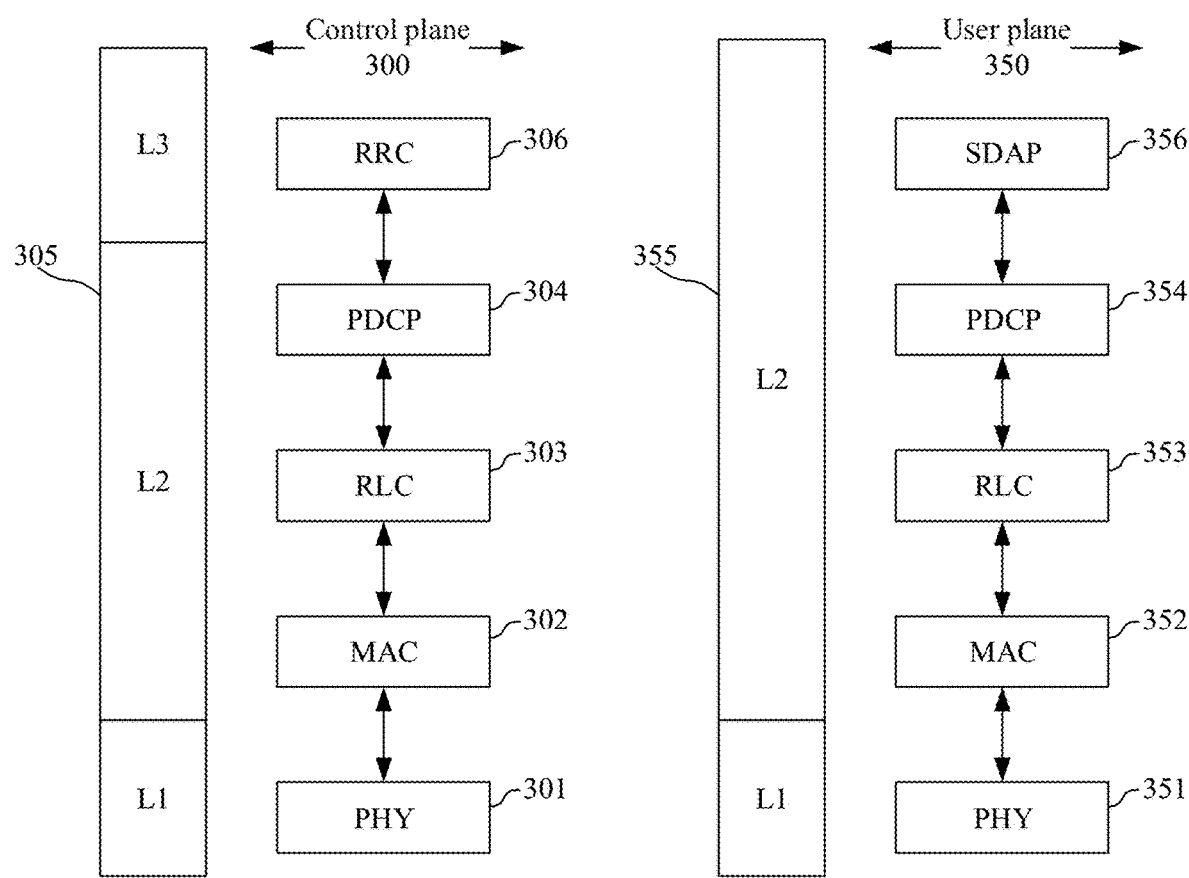
FIG. 3 is a schematic diagram of a radio protocol architecture of each of a user plane and a control plane according to an embodiment of the present application.

Embodiment 3 illustrates a schematic diagram of a radio protocol architecture of each of a user plane and a control plane according to an embodiment of the present application, as shown in FIG. 3. FIG. 3 is a schematic diagram illustrating an embodiment of a radio protocol architecture for each of a user plane 350 and a control plane 300. FIG. 3 uses layer 1, layer 2, and layer 3 to display the radio protocol architecture of the control plane 300 used for a first node (UE or an RSU in V2X, an in-vehicle device, or an in-vehicle communication module) and a second node (a gNB, UE or an RSU in V2X, an in-vehicle device, or an in-vehicle communication module), or between two UEs. The layer 1 (L1 layer) is a lowest layer and various physical layer (PHY) signal processing functions are implemented at this layer. The L1 layer is referred to as PHY 301 herein. The layer 2 (L2 layer) 305 is disposed on the PHY 301, and responsible for a link between the first node and the second node and a link between two UEs through the PHY 301. The L2 layer 305 includes a Medium Access Control (MAC) sublayer 302, a Radio Link Control (RLC) sublayer 303, and a Packet Data Convergence Protocol (PDCP) sublayer 304, and these sublayers are terminated at the second node. The PDCP sublayer 304 provides data encryption and integrity protection, and further provides cross-area movement support of the first node to the second node. The RLC sublayer 303 provides segmentation and reassembly of data packets, implements retransmission of a lost data packet via ARQ, and further provides repeated data packet detection and protocol error detection. The MAC sublayer 302 provides mapping between a logical channel and a transport channel and reuse of the logical channel, and is responsible for allocating, between first nodes, various radio resources (for example, resource blocks) in a cell. The MAC sublayer 302 is further responsible for a HARQ operation. A Radio Resource Control (RRC) sublayer 306 in the layer 3 (L3 layer) in the control plane 300 is responsible for obtaining a radio resource (namely, a radio bearer) and configuring a lower layer by using RRC signaling between the second node and the first node. The radio protocol architecture of the user plane 350 includes layer 1 (L1 layer) and layer 2 (L2 layer). A PHY layer 351, a PDCP sublayer 354 in the L2 layer 355, an RLC sublayer 353 in the L2 layer 355, and a MAC sublayer 352 in the L2 layer 355 of the radio protocol architecture, used for the first node and the second node, in the user plane 350 are substantially the same as the corresponding layers and sublayers in the control plane 300, but the PDCP sublayer 354 further provides header compression used for an upper layer data packet to reduce wireless transmission overheads. The L2 layer 355 in the user plane 350 further includes a Service Data Adaptation Protocol (SDAP) sublayer 356. The SDAP sublayer 356 is responsible for mapping between QoS flows and data radio bearers (DRBs), to support service diversity. Although not shown in the figure, the first node may be provided with several upper layers above the L2 layer 355, including a network layer (for example, an IP layer) terminating at the P-GW on the network side and an application layer terminating at the other end of connection (for example, a remote UE and a server).

In an embodiment, the radio protocol architectures in FIG. 3 are applicable to the first node in the present application.

In an embodiment, the radio protocol architectures in FIG. 3 are applicable to the second node in the present application.

In an embodiment, the first information block in the present application is generated at the PHY 351.

In an embodiment, the first information block in the present application is generated at the MAC 352.

In an embodiment, the first information block in the present application is generated at the PHY 301.

In an embodiment, the first information block in the present application is generated at the MAC 302.

In an embodiment, the first information block in the present application is generated at the RRC 306.

In an embodiment, the first signal in the present application is generated at the PHY 351.

In an embodiment, the first signal in the present application is generated at the MAC 352.

In an embodiment, the first signal in the present application is generated at the PHY 301.

In an embodiment, the first signal in the present application is generated at the MAC 302.

In an embodiment, the first signal in the present application is generated at the RRC 306.

Embodiment 4

Figure 4:
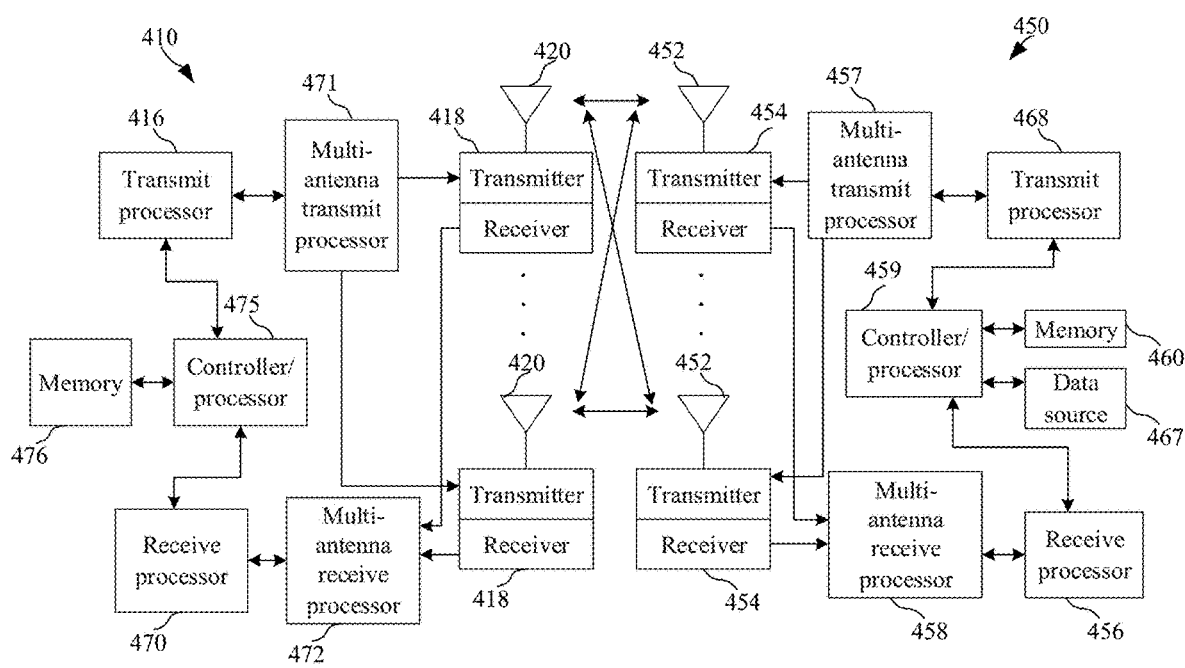
FIG. 4 is a schematic diagram of a first communications device and a second communications device according to an embodiment of the present application.

Embodiment 4 illustrates a schematic diagram of a first communications device and a second communications device according to the present application, as shown in FIG. 4. FIG. 4 is a block diagram of a first communications device 410 and a second communications device 450 communicating with each other in an access network.

The first communications device 410 includes a controller/processor 475, a memory 476, a receive processor 470, a transmit processor 416, a multi-antenna receive processor 472, a multi-antenna transmit processor 471, transmitters/receivers 418, and antennas 420.

The second communications device 450 includes a controller/processor 459, a memory 460, a data source 467, a transmit processor 468, a receive processor 456, a multi-antenna transmit processor 457, a multi-antenna receive processor 458, transmitters/receivers 454, and antennas 452.

In transmission from the first communications device 410 to the second communications device 450, at the first communications device 410, an upper-layer data packet from a core network is provided for the controller/processor 475. The controller/processor 475 implements functionality of the L2 layer. In the transmission from the first communications device 410 to the second communications device 450, the controller/processor 475 provides header compression, encryption, packet segmentation and reordering, multiplexing between a logical channel and a transport channel, and allocation to radio resources of the second communications device 450 based on various priority measurements. The controller/processor 475 is further responsible for retransmission of a lost data packet, and signaling to the second communications device 450. The transmit processor 416 and the multi-antenna transmit processor 471 implement various signal processing functions of the L1 layer (namely, the physical layer). The transmit processor 416 implements encoding and interleaving to facilitate forward error correction (FEC) at the second communications device 450, and mapping of a signal cluster based on various modulation schemes (such as binary phase shift keying (BPSK), quadrature phase shift keying (QPSK), M-phase shift keying (M-PSK), and M-quadrature amplitude modulation (M-QAM)). The multi-antenna transmit processor 471 performs digital spatial precoding on a coded and modulated symbol, including codebook-based precoding and non-codebook-based precoding, and beamforming processing, to generate one or more spatial streams. The transmit processor 416 then maps each spatial stream to a subcarrier, multiplexes the mapped spatial stream with a reference signal (for example, a pilot signal) in time domain and/or frequency domain, and then uses inverse fast Fourier transform (IFFT) to generate a physical channel that carries a time-domain multi-carrier symbol stream. Then, the multi-antenna transmit processor 471 performs an operation of analog precoding receiving/beamforming on the time-domain multi-carrier symbol stream. Each transmitter 418 converts a baseband multi-carrier symbol stream provided by the multi-antenna transmit processor 471 into a radio frequency stream, and then provides the radio frequency stream for different antennas 420.

In the transmission from the first communications device 410 to the second communications device 450, each receiver 454 receives, at the second communications device 450, a signal through its corresponding antenna 452. Each receiver 454 recovers information modulated onto a radio-frequency carrier, converts the radio frequency stream into a baseband multi-carrier symbol stream, and provides the baseband multi-carrier symbol stream for the receive processor 456. The receive processor 456 and the multi-antenna receive processor 458 implement various signal processing functions of the L1 layer. The multi-antenna receive processor 458 performs an operation of analog precoding receiving/beamforming on the baseband multi-carrier symbol stream from the receiver 454. The receive processor 456 uses a Fourier transform (FFT) to convert, from time domain to frequency domain via fast, the baseband multi-carrier symbol stream obtained after the operation of analog precoding receiving/beamforming. In frequency domain, a physical layer data signal and a reference signal are demultiplexed by the receive processor 456. The reference signal is used for channel estimation, and the data signal is recovered after multi-antenna detection performed by the multi-antenna receive processor 458, to obtain any spatial stream that uses the second communications device 450 as a destination. Symbols on each spatial stream are demodulated and recovered in the receive processor 456, and a soft decision is generated. The receive processor 456 then decodes and de-interleaves the soft decision to recover upper-layer data and a control signal that are transmitted by the first communications device 410 on the physical channel. The upper-layer data and the control signal are then provided for the controller/processor 459. The controller/processor 459 implements functions of the L2 layer, and may be associated with the memory 460 that stores program code and data. The memory 460 may be referred to as a computer-readable medium. In the transmission from the first communications device 410 to the second communications device 450, the controller/processor 459 provides demultiplexing between a transport channel and a logical channel, packet reassembly, decryption, header decompression, and control signal processing, to recover an upper-layer data packet from a core network. The upper-layer data packet is then provided for all protocol layers above the L2 layer, or various control signals for the L3 layer for processing by the L3 layer.

In transmission from the second communications device 450 to the first communications device 410, at the second communications device 450, an upper-layer data packet is provided for the controller/processor 459 by using the data source 467. The data source 467 represents all protocol layers above the L2 layer. Similar to the transmit function at the first communications device 410 described in the transmission from the first communications device 410 to the second communications device 450, the controller/processor 459 implements header compression, encryption, packet segmentation and reordering, and multiplexing between a logical channel and a transport channel based on a wireless resource, to implement L2 layer functions for the user plane and the control plane. The controller/processor 459 is further responsible for retransmission of a lost data packet, and signaling to the first communications device 410. The transmit processor 468 performs modulation, mapping, and channel encoding processing. The multi-antenna transmit processor 457 performs digital multi-antenna spatial precoding, including codebook-based precoding and non-codebook-based precoding, and beamforming processing. Then the transmit processor 468 modulates a generated spatial stream into a multi-carrier/single-carrier symbol stream, and the multi-carrier/single-carrier symbol stream is provided for different antennas 452 via the transmitters 454 after undergoing an analog precoding/beamforming operation in the multi-antenna transmit processor 457. Each transmitter 454 first converts a baseband symbol stream provided by the multi-antenna transmit processor 457 into a radio-frequency symbol stream, and then provides the radio-frequency symbol stream for the antennas 452.

In the transmission from the second communications device 450 to the first communications device 410, a function at the first communications device 410 is similar to a receiving function at the second communications device 450 described in the transmission from the first communications device 410 to the second communications device 450. Each receiver 418 receives a radio frequency signal through its corresponding antenna 420, converts the received radio frequency signal into a baseband signal, and provides the baseband signal for the multi-antenna receive processor 472 and the receive processor 470. The receive processor 470 and the multi-antenna receive processor 472 jointly implement functions of the L1 layer. The controller/processor 475 implements functions of the L2 layer. The controller/processor 475 may be associated with the memory 476 that stores program code and data. The memory 476 may be referred to as a computer-readable medium. In the transmission from the second communications device 450 to the first communications device 410, the controller/processor 475 provides demultiplexing between a transport channel and a logical channel, packet reassembly, decryption, header decompression, and control signal processing, to recover an upper-layer data packet from UE 450. The controller/processor 475 may provide the upper-layer data packet to a core network.

In an embodiment, the first node in the present application includes the second communications device 450; and the second node in the present application includes the first communications device 410.

In an embodiment, the first node in the present application includes the first communications device 410; and the second node in the present application includes the second communications device 450.

In an embodiment, the first node in the present application includes the second communications device 450; and the second node in the present application includes the second communications device 450.

In a sub-embodiment of the foregoing embodiment, the second communications device 450 includes: at least one controller/processor. The at least one controller/processor is responsible for a HARQ operation.

In a sub-embodiment of the foregoing embodiment, the first communications device 410 includes: at least one controller/processor. The at least one controller/processor is responsible for a HARQ operation.

In a sub-embodiment of the foregoing embodiment, the first communications device 410 includes: at least one controller/processor. The at least one controller/processor is responsible for a HARQ operation by performing error detection according to a positive acknowledgment (ACK) protocol and/or a negative acknowledgment (NACK) protocol.

In an embodiment, the second communications device 450 includes: at least one memory and at least one processor. The at least one memory includes a computer program code. The at least one memory and the computer program code are configured to be used with the at least one processor. The second communications device 450 is at least configured to: receive a first information block, where the first information block is used to indicate a first time-frequency resource block; perform first access detection in a first sub-band, where the first access detection includes more than one time of first type monitoring; and send the first signal in the first time-frequency resource block when a quantity of times of the first type monitoring, in the first access detection, with monitoring results indicating that a channel is idle is not less than Q1; or abstain from sending of the first signal in the first time-frequency resource block when a quantity of times of the first type monitoring, in the first access detection, with monitoring results indicating that a channel is idle is less than Q1. An end time of the first access detection is not later than a start time of the first time-frequency resource block, the monitoring result of one time of the first type monitoring includes a channel being idle or a channel being busy, and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, the second communications device 450 includes: a memory storing a computer-readable instruction program. When being executed by the at least one processor, the computer-readable instruction program performs actions. The actions include: receiving a first information block, where the first information block is used to indicate a first time-frequency resource block; performing first access detection in a first sub-band, where the first access detection includes more than one time of first type monitoring; and sending the first signal in the first time-frequency resource block when a quantity of times of the first type monitoring, in the first access detection, with monitoring results indicating that a channel is idle is not less than Q1; or abstaining from sending of the first signal in the first time-frequency resource block when a quantity of times of the first type monitoring, in the first access detection, with monitoring results indicating that a channel is idle is less than Q1. An end time of the first access detection is not later than a start time of the first time-frequency resource block, the monitoring result of one time of the first type monitoring includes a channel being idle or a channel being busy, and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, the first communications device 410 includes: at least one memory and at least one processor. The at least one memory includes a computer program code. The at least one memory and the computer program code are configured to be used with the at least one processor. The first communications device 410 is at least configured to: send a first information block, where the first information block is used to indicate a first time-frequency resource block; and monitor a first signal in the first time-frequency resource block. First access detection performed in a first sub-band is used to determine whether the first signal is sent. The first access detection includes more than one time of first type monitoring. The first signal is sent in the first time-frequency resource block when a quantity of times of the first type monitoring, in the first access detection, with monitoring results indicating that a channel is idle is not less than Q1; or the first signal is not sent in the first time-frequency resource block when a quantity of times of the first type monitoring, in the first access detection, with monitoring results indicating that a channel is idle is less than Q1. An end time of the first access detection is not later than a start time of the first time-frequency resource block, the monitoring result of one time of the first type monitoring includes a channel being idle or a channel being busy, and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, the first communications device 410 includes: a memory storing a computer-readable instruction program. When being executed by the at least one processor, the computer-readable instruction program performs actions. The actions include: sending a first information block, where the first information block is used to indicate a first time-frequency resource block; and monitoring a first signal in the first time-frequency resource block. First access detection performed in a first sub-band is used to determine whether the first signal is sent. The first access detection includes more than one time of first type monitoring. The first signal is sent in the first time-frequency resource block when a quantity of times of the first type monitoring, in the first access detection, with monitoring results indicating that a channel is idle is not less than Q1; or the first signal is not sent in the first time-frequency resource block when a quantity of times of the first type monitoring, in the first access detection, with monitoring results indicating that a channel is idle is less than Q1. An end time of the first access detection is not later than a start time of the first time-frequency resource block, the monitoring result of one time of the first type monitoring includes a channel being idle or a channel being busy, and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, at least one of the antenna 452, the receiver 454, the multi-antenna receive processor 458, the receive processor 456, the controller/processor 459, the memory 460, and the data source 467 is configured to receive the first signaling in the present application.

In an embodiment, at least one of the antenna 452, the receiver 454, the multi-antenna receive processor 458, the receive processor 456, the controller/processor 459, the memory 460, and the data source 467 is configured to receive the second signaling in the present application.

In an embodiment, at least one of the antenna 452, the receiver 454, the multi-antenna receive processor 458, the receive processor 456, the controller/processor 459, the memory 460, and the data source 467 is configured to receive the first signal in the present application.

In an embodiment, at least one of the antenna 420, the receiver 418, the multi-antenna receive processor 472, the receive processor 470, the controller/processor 475, and the memory 476 is configured to send the first signaling in the present application.

In an embodiment, at least one of the antenna 420, the receiver 418, the multi-antenna receive processor 472, the receive processor 470, the controller/processor 475, and the memory 476 is configured to send the second signaling in the present application.

In an embodiment, at least one of the antenna 420, the receiver 418, the multi-antenna receive processor 472, the receive processor 470, the controller/processor 475, and the memory 476 is configured to send the first signal in the present application.

Embodiment 5

Figure 5:
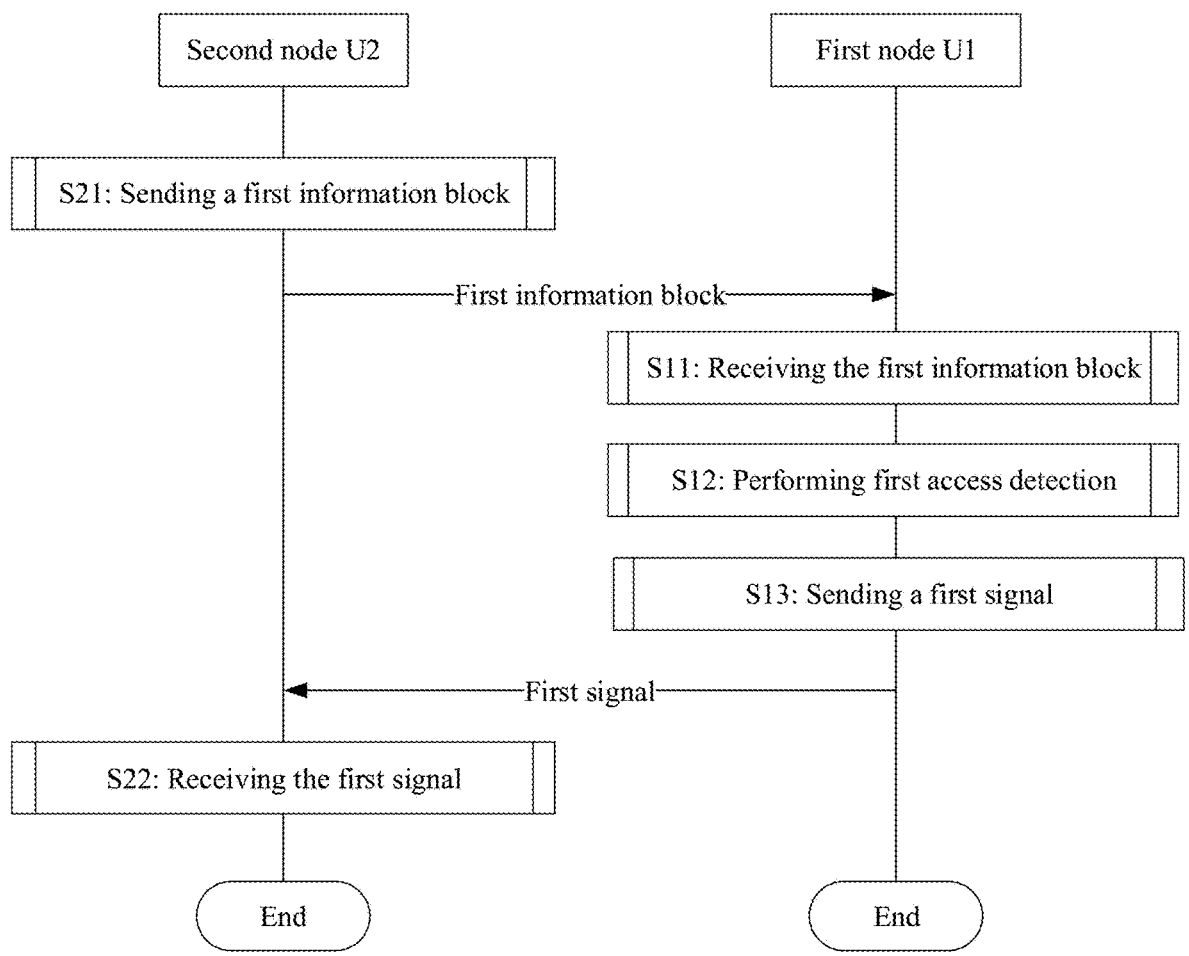
FIG. 5 is a transmission flowchart of a wireless signal according to an embodiment of the present application.

Embodiment 5 illustrates a transmission flowchart of a wireless signal according to an embodiment of the present application, as shown in FIG. 5. In FIG. 5, a first node U1 communicates with a second node U2 through an air interface. A sequence of steps in the blocks in FIG. 5 does not represent a specific temporal sequence relationship.

For the first node U1, a first information block is received in Step S11; first access detection is performed in Step S12; and a first signal is sent in Step S13.

For the second node U2, the first information block is sent in Step S21; and the first signal is received in Step S22.

In Embodiment 5, the first information block is used to indicate a first time-frequency resource block. The first access detection includes more than one time of first type monitoring. The first node U1 sends a first signal in the first time-frequency resource block when a quantity of times of the first type monitoring, in the first access detection, with monitoring results indicating that a channel is idle is not less than Q1. The first node U1 abstains from sending of the first signal in the first time-frequency resource block when a quantity of times of the first type monitoring, in the first access detection, with monitoring results indicating that a channel is idle is less than Q1. An end time of the first access detection is not later than a start time of the first time-frequency resource block, the monitoring result of one time of the first type monitoring includes a channel being idle or a channel being busy, and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, the air interface between the second node U2 and the first node U1 includes a PC5 interface.

In an embodiment, the air interface between the second node U2 and the first node U1 includes a sidelink.

In an embodiment, the air interface between the second node U2 and the first node U1 includes a Uu interface.

In an embodiment, the air interface between the second node U2 and the first node U1 includes a cellular link.

In an embodiment, the air interface between the second node U2 and the first node U1 includes a radio interface between user equipment and user equipment.

In an embodiment, the air interface between the second node U2 and the first node U1 includes a radio interface between a base station device and user equipment.

Embodiment 6

Figure 6:
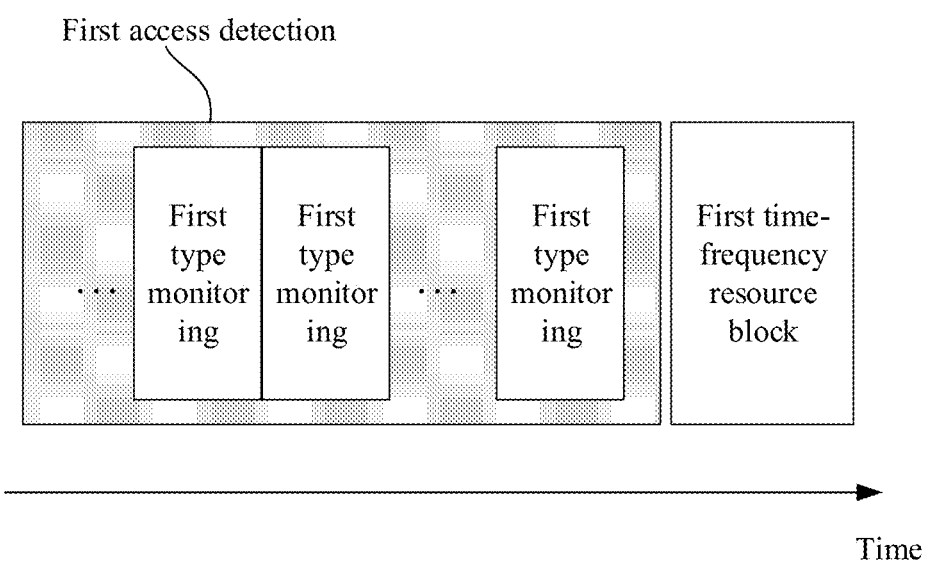
FIG. 6 is a schematic diagram showing time resources occupied by first access detection and a first time-frequency resource block according to an embodiment of the present application.

Embodiment 6 illustrates a schematic diagram showing time resources occupied by first access detection and a first time-frequency resource block according to an embodiment of the present application, as shown in FIG. 6. In FIG. 6, a block filled with a gray background indicates a time resource included by the first access detection. In FIG. 6, the first access detection includes more than one time of first type monitoring; the more than one time of first type monitoring is arranged sequentially in time domain; and the first time-frequency resource block is after the first access detection in time domain.

In an embodiment, any two of the more than one time of first type monitoring have a same duration period.

In an embodiment, any two of the more than one time of first type monitoring have different duration periods.

In an embodiment, a duration period of any two of the more than one time of first type monitoring is one of 4 microseconds, 5 microseconds, 7 microseconds, 9 microseconds, 16 microseconds, and 25 microseconds.

In an embodiment, there is no interval between any two temporally consecutive times of the more than one time of first type monitoring.

In an embodiment, intervals between every two temporally consecutive times of the more than one time of first type monitoring are the same.

In an embodiment, the first access detection is a channel access procedure.

In an embodiment, the first access detection is a channel access procedure on an unlicensed spectrum.

In an embodiment, the first access detection is a Type 1 uplink channel access procedure. For a definition of the Type 1 uplink channel access procedure, refer to 3GPP TS37.213.

In an embodiment, the first access detection is a Type 1 downlink channel access procedure. For a definition of the Type 1 downlink channel access procedure, refer to 3GPP In an embodiment, the first access detection is one time of category 4 LBT (Cat 4 LBT).

In an embodiment, the first type monitoring includes one time of energy detection.

In an embodiment, the first type monitoring includes a plurality of times of energy detection.

In an embodiment, the first type monitoring includes coherent detection.

In an embodiment, the first type monitoring includes a cyclic redundancy check (CRC).

In an embodiment, the first type monitoring includes jamming sensing.

In an embodiment, a duration period of the first type monitoring is a sensing slot duration. For a definition of the sensing slot duration, refer to 3GPP TS37.213.

In an embodiment, there is no interval between the first access detection and the first time-frequency resource group.

In an embodiment, there is a first interval between the first access detection and the first time-frequency resource group.

In an embodiment, the first receiving set performs energy detection in the first interval. When a result of the energy detection indicates that a channel is idle, the first time-frequency resource block is configured to send the first signal.

In an embodiment, the first receiving set performs a plurality of times of energy detection in the first interval. When all results of the plurality of times of energy detection indicates that a channel is idle, the first time-frequency resource block is configured to send the first signal.

In an embodiment, the first information block is used to indicate a priority parameter of the first signal.

In an embodiment, the first information block is used to indicate a type of the first access detection.

In an embodiment, the first information block is used to indicate that a type of the first access detection is Cat 4 LBT.

In an embodiment, the first information block is used to indicate that a type of the first access detection is a Type 1 uplink access procedure.

Embodiment 7

Figure 7:
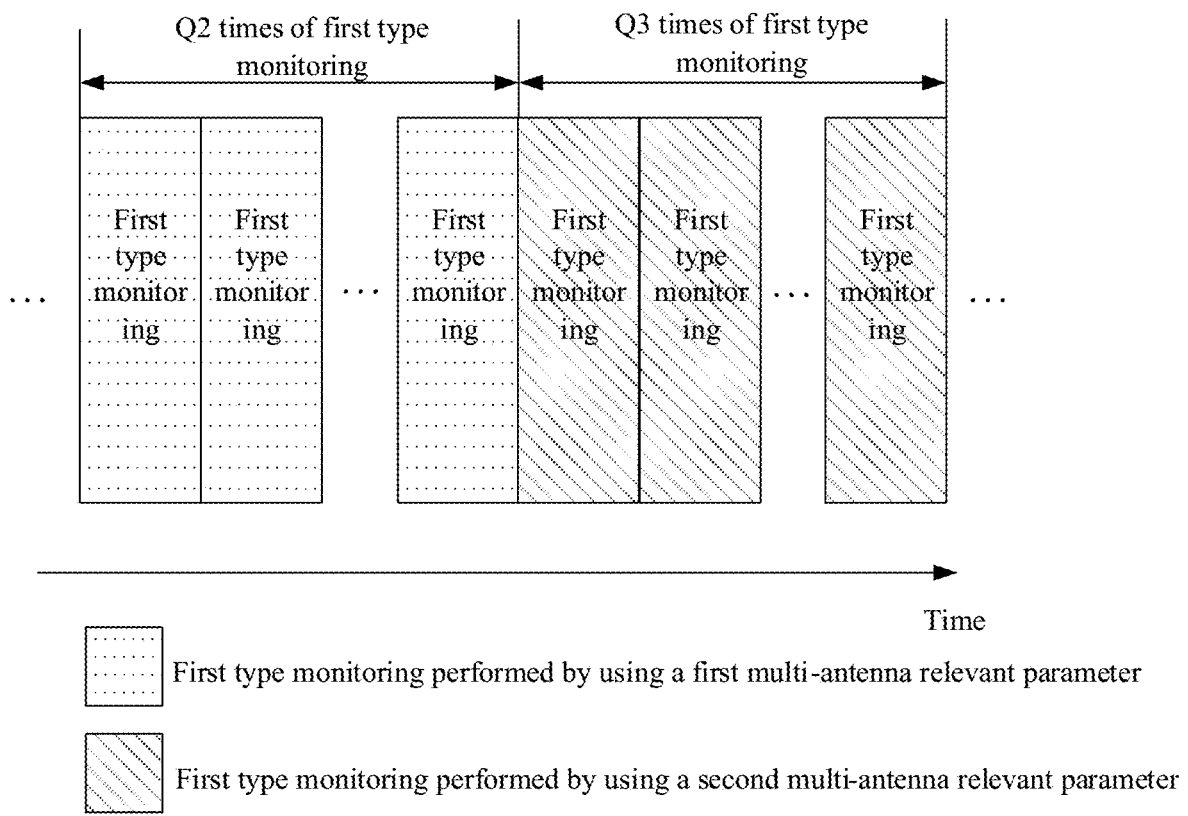
FIG. 7 is a schematic diagram showing time resources respectively occupied by Q2 times of first type monitoring and Q3 times of first type monitoring included by first access detection and multi-antenna relevant parameters of the Q2 times of first type monitoring and the Q3 times of first type monitoring according to an embodiment of the present application.

Embodiment 7 illustrates a schematic diagram showing time resources respectively occupied by Q2 times of first type monitoring and Q3 times of first type monitoring included by first access detection and multi-antenna relevant parameters of the Q2 times of first type monitoring and the Q3 times of first type monitoring according to an embodiment of the present application, as shown in FIG. 7. In FIG. 7, a block filled with horizontal stripes denotes a schematic diagram of a time domain resource of Q2 times of first type monitoring performed by using a first multi-antenna relevant parameter; and a block filled with diagonal stripes denotes a schematic diagram of a time domain resource of Q3 times of first type monitoring performed by using a second multi-antenna relevant parameter. In FIG. 7, the Q2 times of first type monitoring are arranged successively in time domain; the Q3 times of first type monitoring are arranged successively in time domain; and the Q3 times of first type monitoring are after the Q2 times of first type monitoring in time domain.

In an embodiment, a total quantity of times of the first type monitoring, in the Q2 times of first type monitoring and the Q3 times of first type monitoring, with monitoring results indicating that a channel is idle is Q1.

In an embodiment, a total quantity of times of the first type monitoring, in the Q2 times of first type monitoring and the Q3 times of first type monitoring, with monitoring results indicating that a channel is idle is less than Q1.

In an embodiment, Q3 is equal to 1.

In an embodiment, Q3 is greater than 1.

In an embodiment, when a first condition set is satisfied, the first receiving set uses the second multi-antenna relevant parameter to perform the Q3 times of first type monitoring; or when the first condition set is unsatisfied, the first receiving set uses the first multi-antenna relevant parameter to perform the Q3 times of first type monitoring.

In an embodiment, the first condition set includes: a monitoring result of the last one of the Q2 times of first type monitoring indicating that a channel is busy.

In an embodiment, the first condition set includes: a quantity of times of the first type monitoring, in the Q2 times of first type monitoring, with monitoring results indicating that a channel is busy being greater than a first quantity threshold that is a positive integer.

In an embodiment, the first condition set includes: a quantity of times of the first type monitoring, in the Q2 times of first type monitoring, with monitoring results indicating that a channel is busy being not less than a first quantity threshold that is a positive integer.

In an embodiment, the first condition set includes: the first node being configured with the second multi-antenna relevant parameter.

In an embodiment, the first access detection includes dynamic frequency selection (DFS).

In an embodiment, when strength of a signal in the first sub-band is not less than a candidate power threshold, a monitoring result of the first type monitoring indicates that a channel is busy; or when the strength of the signal in the first sub-band is less than the candidate power threshold, a monitoring result of the first type monitoring indicates that a channel is idle.

In an embodiment, the candidate power threshold is related to the multi-antenna relevant parameter of the first type monitoring.

In an embodiment, a unit of the candidate power threshold is dBm.

In an embodiment, the candidate power threshold is defined in a radiation interface boundary (RIB).

In an embodiment, the candidate power threshold is defined in an antenna connector.

In an embodiment, the candidate power threshold is defined in Over The Air (OTA).

In an embodiment, a unit of the candidate power threshold is watt.

In an embodiment, when the first type monitoring is performed by using the first multi-antenna relevant parameter, the candidate power threshold is the first power threshold.

In an embodiment, when the first type monitoring is performed by using the second multi-antenna relevant parameter, the candidate power threshold is the second power threshold.

In an embodiment, the first power threshold is associated with the first multi-antenna relevant parameter and used to determine the monitoring results of the Q2 times of first type monitoring; the second power threshold is associated with the second multi-antenna relevant parameter and used to determine the monitoring results of the Q3 times of first type monitoring; and the second power threshold is not less than the first power threshold.

In an embodiment, the first type monitoring includes measurement of a reference signal.

In an embodiment, the first type monitoring includes measurement of a CSI-RS.

In an embodiment, the first type monitoring includes measurement of an SSB.

In an embodiment, the first type monitoring is used to determine reference signal received power (RSRP).

In an embodiment, the first type monitoring is used to determine a received signal strength indicator (RSSI).

In an embodiment, the first type monitoring is used to determine a signal to interference and noise ratio (SINR).

In an embodiment, the first type monitoring is used to determine a channel quality indicator (CQI).

In an embodiment, the first type monitoring includes measurement of a beam.

In an embodiment, the first type monitoring includes measurement of CSI.

In an embodiment, the first type monitoring includes determining beam measurement.

In an embodiment, the first type monitoring includes determining whether to perform beam switching.

In an embodiment, a quantity of times of the first type monitoring, in the Q2 times of first type monitoring, with monitoring results indicating that a channel is configured to determine the second multi-antenna relevant parameter.

In an embodiment, the quantity of times of the first type monitoring, in the Q2 times of first type monitoring, with monitoring results indicating that a channel is configured to determine the second multi-antenna relevant parameter from N multi-antenna relevant parameters; the second multi-antenna relevant parameter is one of the N multi-antenna relevant parameters; and N is a positive integer greater than 1.

In an embodiment, a first integer is the quantity of times of the first type monitoring, in the Q2 times of first type monitoring, with monitoring results indicating that a channel is idle; the first integer is used to determine a first coefficient; and the first coefficient belongs to a first value range. The N multi-antenna relevant parameters are in a one-to-one correspondence with N value ranges, respectively; and the second multi-antenna relevant parameter is a multi-antenna relevant parameter, in the N multi-antenna relevant parameters, corresponding to the first value range.

In a sub-embodiment of the foregoing embodiment, the first coefficient is determined based on a value obtained after dividing the first integer by Q2.

In a sub-embodiment of the foregoing embodiment, the first coefficient is equal to the value obtained after dividing the first integer by Q2.

In a sub-embodiment of the foregoing embodiment, the first coefficient is linearly related to the value obtained after dividing the first integer by Q2.

In a sub-embodiment of the foregoing embodiment, the first coefficient is determined based on a value obtained after dividing the first integer by Q1.

In a sub-embodiment of the foregoing embodiment, the first coefficient is equal to the value obtained after dividing the first integer by Q1.

In a sub-embodiment of the foregoing embodiment, the first coefficient is linearly related to the value obtained after dividing the first integer by Q1.

Embodiment 8

Figure 8:
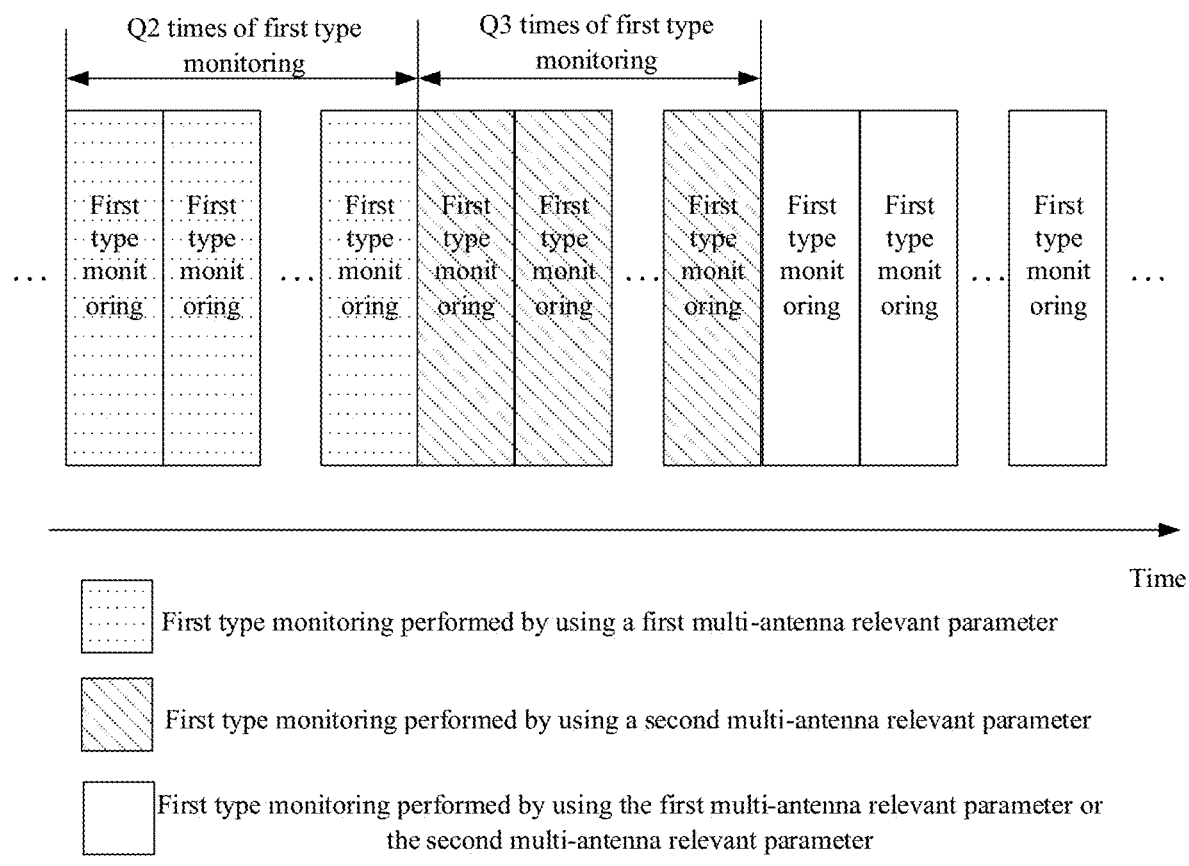
FIG. 8 is a schematic diagram showing time resources respectively occupied by remaining times of first type monitoring, included by first access detection, other than Q2 times of first type monitoring and Q3 times of first type monitoring and multi-antenna relevant parameters of the remaining times of first type monitoring according to an embodiment of the present application.

Embodiment 8 illustrates a schematic diagram showing time resources respectively occupied by remaining times of first type monitoring, included by first access detection, other than Q2 times of first type monitoring and Q3 times of first type monitoring and multi-antenna relevant parameters of the remaining times of first type monitoring according to an embodiment of the present application, as shown in FIG. 8. In FIG. 8, a block filled with horizontal stripes denotes a schematic diagram of a time domain resource of Q2 times of first type monitoring performed by using a first multi-antenna relevant parameter; a block filled with diagonal stripes denotes a schematic diagram of a time domain resource of Q3 times of first type monitoring performed by using a second multi-antenna relevant parameter; and a block filled with white denotes a schematic diagram of a time domain resource occupied by remaining times of first type monitoring, performed by using the first or second multi-antenna relevant parameter, other than the Q2 times of first type monitoring and the Q3 times of first type monitoring. In FIG. 7, the Q2 times of first type monitoring are arranged successively in time domain; the Q3 times of first type monitoring are arranged successively in time domain; the Q3 times of first type monitoring are after the Q2 times of first type monitoring in time domain; and a positive integer quantity of first type monitoring exist after the Q3 times of first type monitoring.

In an embodiment, the Q2 times of first type monitoring, the Q3 times of first type monitoring, and the remaining times of first type monitoring other than the Q2 times of first type monitoring and the Q3 times of first type monitoring are all of first type monitoring included by the first access detection.

In an embodiment, the Q2 times of first type monitoring, the Q3 times of first type monitoring, and the remaining times of first type monitoring other than the Q2 times of first type monitoring and the Q3 times of first type monitoring are some of first type monitoring included by the first access detection.

In an embodiment, a total quantity of times of the first type monitoring, among the Q2 times of first type monitoring, the Q3 times of first type monitoring, and the remaining times of first type monitoring other than the Q2 times of first type monitoring and the Q3 times of first type monitoring, with monitoring results indicating that a channel is idle is Q1.

In an embodiment, a total quantity of times of the first type monitoring, among the Q2 times of first type monitoring, the Q3 times of first type monitoring, and the remaining times of first type monitoring other than the Q2 times of first type monitoring and the Q3 times of first type monitoring, with monitoring results indicating that a channel is idle is less than Q1.

In an embodiment, when a second condition set is satisfied, the first receiving set uses the second multi-antenna relevant parameter to perform the remaining times of first type monitoring other than the Q2 times of first type monitoring and the Q3 times of first type monitoring; or when the second condition set is unsatisfied, the first receiving set uses the first multi-antenna relevant parameter to perform the remaining times of first type monitoring other than the Q2 times of first type monitoring and the Q3 times of first type monitoring.

In an embodiment, when a second condition set is satisfied, the first receiving set uses the second multi-antenna relevant parameter to perform the remaining times of first type monitoring other than the Q2 times of first type monitoring and the Q3 times of first type monitoring; or when the second condition set is unsatisfied, the first receiving set independently selects the first multi-antenna relevant parameter or the second multi-antenna relevant parameter to perform the remaining times of first type monitoring other than the Q2 times of first type monitoring and the Q3 times of first type monitoring.

In an embodiment, the sentence "the first receiving set independently selects the first multi-antenna relevant parameter or the second multi-antenna relevant parameter to perform the remaining times of first type monitoring other than the Q2 times of first type monitoring and the Q3 times of first type monitoring" includes: the first receiving set independently selects the first multi-antenna relevant parameter or the second multi-antenna relevant parameter based on a first measure to perform the remaining times of first type monitoring other than the Q2 times of first type monitoring and the Q3 times of first type monitoring.

In a sub-embodiment of the foregoing embodiment, the first measure includes a channel measurement result in the first sub-band.

In a sub-embodiment of the foregoing embodiment, the first measure includes a channel occupancy ratio in the first sub-band.

In a sub-embodiment of the foregoing embodiment, the first measure includes a channel vacancy ratio in the first sub-band.

In a sub-embodiment of the foregoing embodiment, the first measure includes interference intensity measurement in the first sub-band.

In a sub-embodiment of the foregoing embodiment, the first measure includes a modulation and coding scheme of the first signal.

In a sub-embodiment of the foregoing embodiment, the first measure includes a multi-antenna relevant parameter of the first signal; and the multi-antenna relevant parameter of the first signal includes a QCL association relationship between the first signal and a reference signal.

In a sub-embodiment of the foregoing embodiment, the first measure includes a multi-antenna relevant parameter of the first signal; and the multi-antenna relevant parameter of the first signal includes a QCL association relationship between a reference signal included by the first signal and another reference signal.

In an embodiment, the second condition set includes: all monitoring results of the Q3 times of first type monitoring indicating that a channel is idle.

In an embodiment, the second condition set includes: a quantity of times of the first type monitoring, in the Q3 times of first type monitoring, with monitoring results indicating that a channel is idle being greater than a second quantity threshold that is a positive integer.

In an embodiment, the second condition set includes: a quantity of times of the first type monitoring, in the Q3 times of first type monitoring, with monitoring results indicating that a channel is idle being not less than a second quantity threshold that is a positive integer.

In an embodiment, a value of Q3 is equal to 1.
In an embodiment, a value of Q3 is greater than 1.

Embodiment 9

Figure 9:
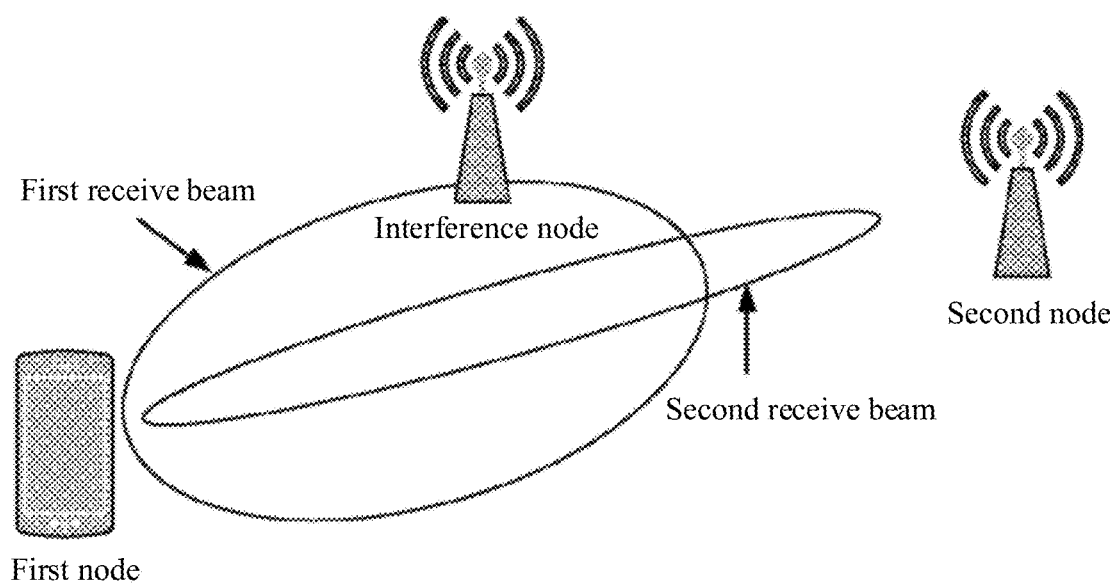
FIG. 9 is a schematic diagram showing widths of a first receive beam and a second receive beam of a first node according to an embodiment of the present application.

Embodiment 9 illustrates a schematic diagram showing widths of a first receive beam and a second receive beam of the first node according to an embodiment of the present application, as shown in FIG. 9. In FIG. 9, widths of the first receive beam and the second receive beam are denoted by two different ellipses. In Embodiment 9, the first multi-antenna relevant parameter in the present application includes the first receive beam; and the second multi-antenna relevant parameter in the present application includes the second receive beam. For example, in FIG. 9, an interference node exists in a coverage range of the first receive beam. When the interference node starts to send a signal, a monitoring result of the first type monitoring performed by using the first receive beam indicates that a channel is busy. Because the interference node is not in a coverage range of the second receive beam, a monitoring result of the first type monitoring performed by using the second receive beam indicates that a channel is idle. Therefore, in a process of the first access detection, if an interference node appears and causes failure of the first type monitoring, switching from the first receive beam to the second receive beam helps improve a success probability of access detection.

In an embodiment, the second multi-antenna relevant parameter is spatially associated with the first multi-antenna relevant parameter.

In an embodiment, the second multi-antenna relevant parameter and the first multi-antenna relevant parameter belongs to a same multi-antenna relevant parameter set, and the multi-antenna relevant parameter set includes a plurality of multi-antenna relevant parameters.

In an embodiment, a spatial direction of the second multi-antenna relevant parameter is a sub-set of a spatial direction of the first multi-antenna relevant parameter.

In an embodiment, the first multi-antenna relevant parameter includes a first spatial reception filter; the second multi-antenna relevant parameter includes a second spatial reception filter; and a spatial direction of the first spatial reception filter includes a spatial direction of the second spatial reception filter.

In an embodiment, the first multi-antenna relevant parameter includes an omnidirectional reception filter; and the second multi-antenna relevant parameter includes a directional reception filter.

In an embodiment, the first multi-antenna relevant parameter includes a quasi-omni directional reception filter; and the second multi-antenna relevant parameter includes a directional reception filter.

In an embodiment, the first multi-antenna relevant parameter includes an omnidirectional receive beam; and the second multi-antenna relevant parameter includes a directional receive beam.

In an embodiment, the first multi-antenna relevant parameter includes a quasi-omni directional receive beam; and the second multi-antenna relevant parameter includes a directional receive beam.

In an embodiment, the first type monitoring performed by using the first multi-antenna relevant parameter includes performing omnidirectional LBT.

In an embodiment, the first type monitoring performed by using the first multi-antenna relevant parameter includes performing quasi-omni directional LBT.

In an embodiment, the first type monitoring performed by using the second multi-antenna relevant parameter includes performing directional LBT.

In an embodiment, a multi-antenna relevant parameter of the first signal is used to determine the second multi-antenna relevant parameter.

In an embodiment, the multi-antenna relevant parameter of the first signal includes a transmission spatial filter of the first signal; the second multi-antenna relevant parameter includes a reception spatial filter; and a spatial direction of the transmission spatial filter of the first signal is within a spatial direction of the reception spatial filter included by the second multi-antenna relevant parameter.

In an embodiment, the multi-antenna relevant parameter of the first signal includes a transmission spatial filter of the first signal; the second multi-antenna relevant parameter includes a reception spatial filter; and a spatial direction of the transmission spatial filter of the first signal is the same as a spatial direction of the reception spatial filter included by the second multi-antenna relevant parameter.

In an embodiment, the multi-antenna relevant parameter of the first signal is the same as the second multi-antenna relevant parameter.

In an embodiment, the multi-antenna relevant parameter of the first signal and the second multi-antenna relevant parameter are associated with a same reference signal.

In an embodiment, a reference signal associated with the multi-antenna relevant parameter of the first signal and a reference signal associated with the second multi-antenna relevant parameter have a spatial association relationship.

In an embodiment, a reference signal associated with the multi-antenna relevant parameter of the first signal and a reference signal associated with the second multi-antenna relevant parameter have a QCL relationship.

In an embodiment, the multi-antenna relevant parameter of the first signal includes a transmission spatial filter of the first signal; the first multi-antenna relevant parameter includes a reception spatial filter; and a spatial direction of the transmission spatial filter of the first signal is included in a spatial direction of the reception spatial filter included by the first multi-antenna relevant parameter.

In an embodiment, the multi-antenna relevant parameter of the first signal includes a transmission spatial filter of the first signal; the first multi-antenna relevant parameter includes a reception spatial filter; and a spatial direction of the transmission spatial filter of the first signal is the same as a spatial direction of the reception spatial filter included by the first multi-antenna relevant parameter.

In an embodiment, the multi-antenna relevant parameter of the first signal is the same as the first multi-antenna relevant parameter.

In an embodiment, the multi-antenna relevant parameter of the first signal and the first multi-antenna relevant parameter are associated with a same reference signal.

In an embodiment, a reference signal associated with the multi-antenna relevant parameter of the first signal and a reference signal associated with the first multi-antenna relevant parameter have a spatial association relationship.

In an embodiment, a reference signal associated with the multi-antenna relevant parameter of the first signal and a reference signal associated with the first multi-antenna relevant parameter have a QCL relationship.

Embodiment 10

Figure 10:
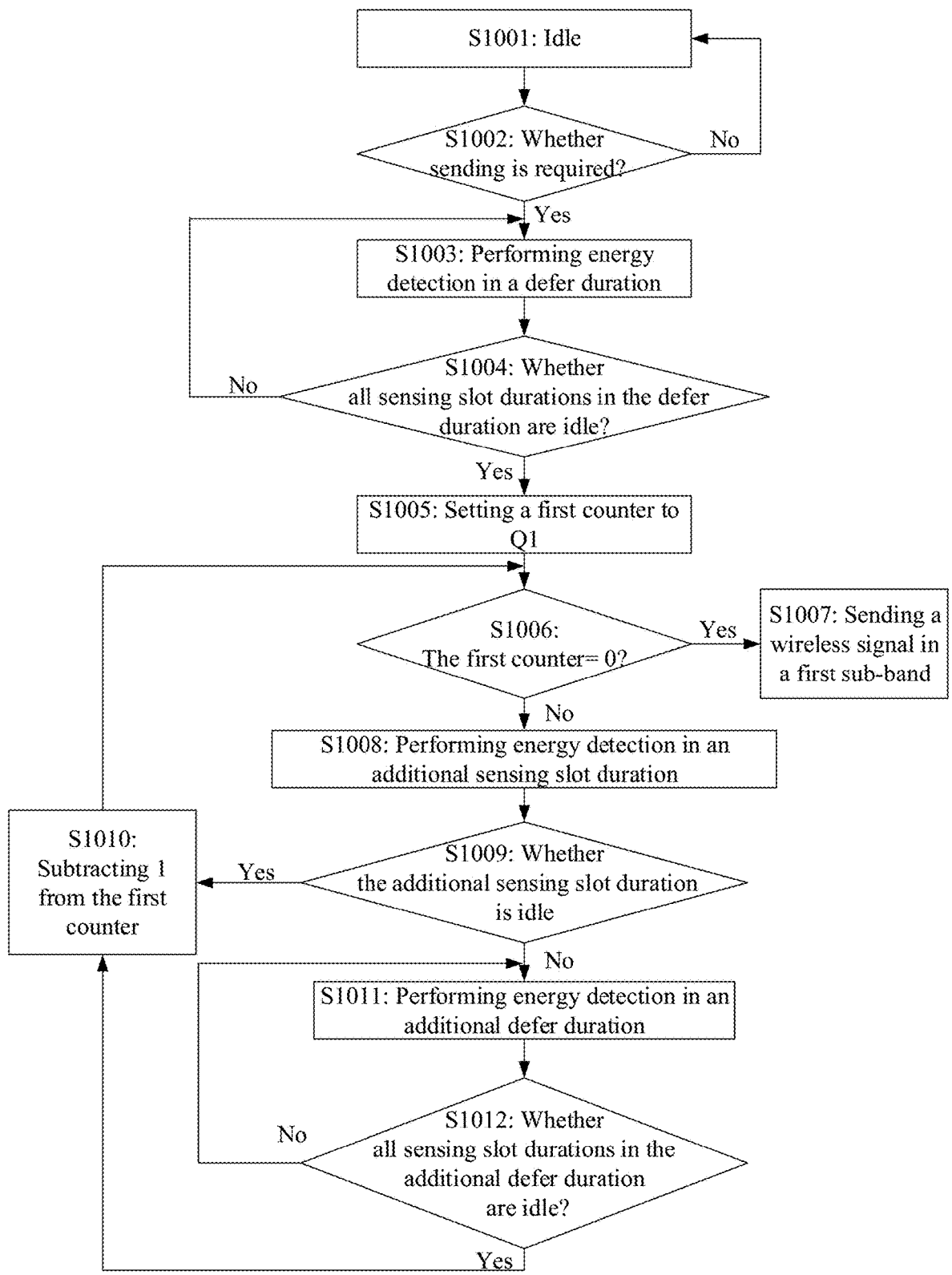
FIG. 10 is a schematic diagram of first type channel sensing according to an embodiment of the present application.

Embodiment 10 illustrates a schematic diagram of first type channel sensing according to an embodiment of the present application, as shown in FIG. 10.

In an embodiment, the first access detection in the present application includes the first type channel sensing.

In an embodiment, the first type monitoring in the present application includes the energy detection.

In Embodiment 10, the first type channel sensing includes performing a plurality of times of energy detection in a plurality of time sub-pools in the first sub-band, to obtain a plurality of detection values. A wireless signal is sent in the first sub-band when and only when Q1 of the plurality of detection values are less than a first sensing threshold, and Q1 is a positive integer. A process of the plurality of times of energy detection may be described by using a flowchart in FIG. 10.

In FIG. 10, the first node or the second node is in an idle state in Step S1001; whether sending is required is determined in Step S1002; energy detection is performed in a defer duration in Step S1003; whether all sensing slot durations in the defer duration are idle is determined in Step S1004; if all the sensing slot durations are idle, a first counter is set to Q1 in Step S1005; or if all the sensing slot durations are not idle, the process returns to Step S1004; whether the first counter is 0 is determined in Step S1006; if the first counter is 0, a wireless signal is sent in the first sub-band in the present application in Step S1007; or if the first counter is not 0, energy detection is performed in an additional sensing slot duration in Step S1008; whether the additional sensing slot duration is idle is determined in Step S1009; and if the additional sensing slot duration is idle, 1 is subtracted from the first counter in Step S1010, and then the process returns to Step S1006; or if the additional sensing slot duration is not idle, energy detection is performed in an additional defer duration in Step S1011; whether all sensing slot durations in the additional defer duration are idle is determined in Step S1012; and if all the sensing slot durations are idle, the process returns to Step S1010; or if all the sensing slot durations are not idle, the process returns to Step S1011.

In an embodiment, any sensing slot duration in a given time duration includes one of the plurality of time sub-pools; and the given time duration is any duration of all defer durations, all additional sensing slot durations, and all additional defer durations in FIG. 10.

In an embodiment, performing energy detection in a given time duration is: performing the energy detection in all sensing slot durations in the given time duration; and the given time duration is any duration of all defer durations, all additional sensing slot durations, and all additional defer durations in FIG. 10.

In an embodiment, determining through energy detection that a given time duration is idle is: determining through energy detection that all the sensing slot durations included in the given duration are idle; and the given time duration is any duration of all defer durations, all additional sensing slot durations, and all additional defer durations in FIG. 10.

In an embodiment, determining through energy detection that a given sensing slot duration is idle is: sensing, in a given time unit by the first node, powers of all wireless signals in the first sub-band, and averaging the powers by time; an obtained receiving power is less than the first sensing threshold; and the given time unit is a persistent time segment in the given sensing slot duration.

In a sub-embodiment of the foregoing embodiment, a duration period of the given time unit is not less than 4 microseconds.

In an embodiment, determining through energy detection that a given sensing slot duration is idle is: sensing, in a given time unit by the first node, energies of all wireless signals in the first sub-band, and averaging the energies by time; an obtained receiving energy is less than the first sensing threshold; and the given time unit is a persistent time segment in the given sensing slot duration.

In a sub-embodiment of the foregoing embodiment, a duration period of the given time unit is not less than 4 microseconds.

In an embodiment, determining through energy detection that a given sensing slot duration is idle is: performing, by the first node, the energy detection in a time sub-pool included by the given sensing slot duration; an obtained detection value is less than the first sensing threshold; the time sub-pool belongs to the plurality of time sub-pools; and the detection value belongs to the plurality of detection values.

In an embodiment, performing energy detection in a given time duration is: performing the energy detection in all time sub-pools in the given time duration; the given time duration is any duration of all defer durations, all additional sensing slot durations, and all additional defer durations in FIG. 10; and all the time sub-pools belong to the plurality of time sub-pools.

In an embodiment, determining through energy detection that a given time duration is idle is: performing the energy detection in all time sub-pools included in the given time duration; all obtained detection values are less than the first sensing threshold; the given time duration is any duration of all defer durations, all additional sensing slot durations, and all additional defer durations in FIG. 10; all the time sub-pools belong to the plurality of time sub-pools; and the detection values belong to the plurality of detection values.

In an embodiment, a duration period of a defer duration is 16 microseconds plus M2 9 microseconds; and M2 is a positive integer.

In a sub-embodiment of the foregoing embodiment, a defer duration includes (M1+1) time sub-pools of the plurality of time sub-pools; and M1 is a positive integer.

In a sub-embodiment of the foregoing embodiment, a priority class corresponding to the first signal in the present application is used to determine M1.

As a reference embodiment of the foregoing sub-embodiment, the priority class is a channel access priority class. For a definition of the channel access priority class, refer to 3GPP TS37.213.

In a sub-embodiment of the foregoing embodiment, M2 is one of 1, 2, 3, and 7.

In an embodiment, the plurality of times of energy detection are used to determine whether the first sub-band is idle.

In an embodiment, the plurality of times of energy detection are used to determine whether the first sub-band can be used by the first node in transmission of a wireless signal.

In an embodiment, the plurality of times of energy detection are used to determine whether the first sub-band can be used by the first node in transmission of a wireless signal that is spatially associated with the plurality of times of energy detection.

In an embodiment, the plurality of times of energy detection is energy detection in LBT. For a specific definition of LBT, refer to 3GPP TS37.213.

In an embodiment, the plurality of times of energy detection is energy detection in CCA. For a specific definition of CCA, refer to 3GPP TR36.889.

In an embodiment, any one of the plurality of times of energy detection is implemented in a manner defined in 3GPP TS37.213.

In an embodiment, any one of the plurality of times of energy detection is implemented by performing energy detection in Wi-Fi.

In an embodiment, any one of the plurality of times of energy detection is implemented by measuring an RSSI.

In an embodiment, any one of the plurality of times of energy detection is implemented in an energy detection manner in LTE LAA.

In an embodiment, all units of the plurality of times of energy detection are dBm.

In an embodiment, all units of the plurality of times of energy detection are mW.

In an embodiment, all units of the plurality of times of energy detection are Joule.

In an embodiment, a unit of the first sensing threshold is dBm.

In an embodiment, a unit of the first sensing threshold is mW.

In an embodiment, a unit of the first sensing threshold is Joule.

In an embodiment, the first sensing threshold is less than or equal to −72 dBm.

In an embodiment, the first sensing threshold is any value less than or equal to a first given value.

In a sub-embodiment of the foregoing embodiment, the first given value is predefined.

In a sub-embodiment of the foregoing embodiment, the first given value is configured through higher-layer signaling; and the first node is user equipment.

In an embodiment, the first type included in the first candidate type set in the present application includes the first candidate channel sensing operation.

In an embodiment, the first type monitoring in the present application includes category 2 channel sensing.

In an embodiment, channel sensing in the present application includes category 2 channel sensing.

In an embodiment, an operation of the category 2 channel sensing includes separately performing Q4 times of energy detection in a second time window of the first sub-band, to obtain Q4 detection values; and Q4 is a positive integer. The first sub-band is used to send a wireless signal when and only when Q5 of the Q4 detection values are less than the first sensing threshold; and Q5 is a positive integer not greater than Q4.

In a sub-embodiment of the foregoing embodiment, a length of the second time window is predefined.

In a sub-embodiment of the foregoing embodiment, the length of the second time window is one of 9 microseconds, 16 microseconds, 25 microseconds, 5 microseconds, 8 microseconds, and 13 microseconds.

Embodiment 11

Figure 11:
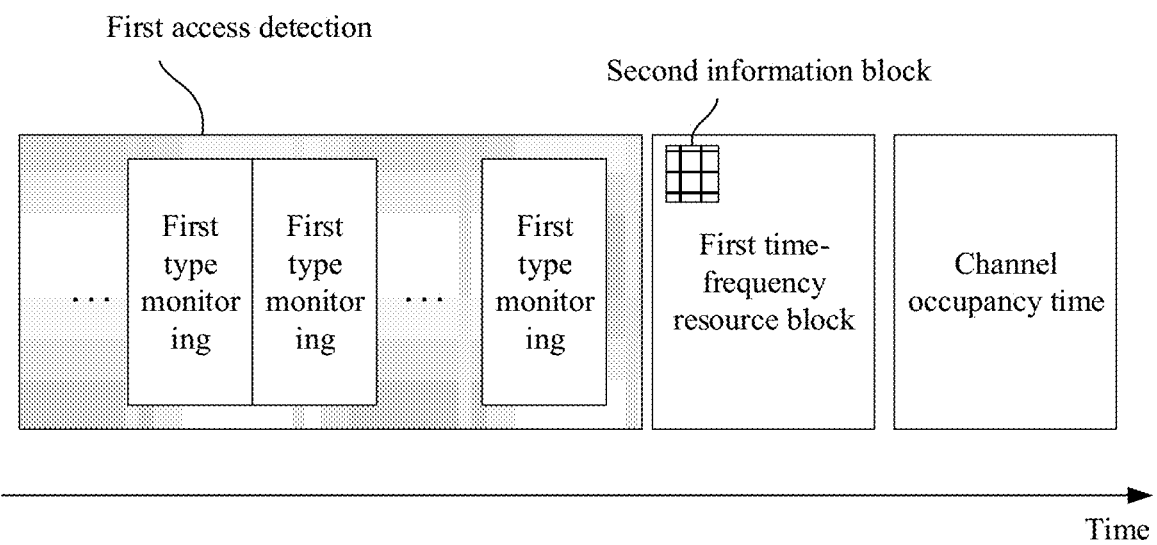
FIG. 11 is a schematic diagram of a time-domain relationship among a plurality of times of first type monitoring included by first access detection, a first time-frequency resource block, and a channel occupancy time according to an embodiment of the present application.

Embodiment 11 illustrates a schematic diagram of a time-domain relationship among a plurality of times of first type monitoring included by first access detection, a first time-frequency resource block, and a channel occupancy time according to an embodiment of the present application, as shown in FIG. 11. In FIG. 11, the first access detection includes more than one time of first type monitoring. The more than one time of first type monitoring is arranged sequentially in time domain; the first time-frequency resource block is after the first access detection in time domain; the first time-frequency resource block includes a second information block; and the channel occupancy time is after the second time-frequency resource block in time domain.

In an embodiment, the channel occupancy time includes channel occupancy time (COT). For a definition of the COT, refer to 3GPP TS37.213.

In an embodiment, the channel occupancy time includes part of the COT.

In an embodiment, the second information block includes UCI.

In an embodiment, the second information block includes UCI transmitted on a PUSCH.

In an embodiment, the second information block includes configured grant-uplink control information (CG-UCI).

The first signal includes a second information block; and the second information block is used to indicate that the second multi-antenna relevant parameter is used in the first access detection.

In an embodiment, the second information block is used to indicate the second multi-antenna relevant parameter.

In an embodiment, the second multi-antenna relevant parameter belongs to a first multi-antenna relevant parameter group; and the first multi-antenna relevant parameter group includes N multi-antenna relevant parameters.

In an embodiment, the first multi-antenna relevant parameter belongs to the first multi-antenna relevant parameter group.

In an embodiment, the second information block is used to indicate the second multi-antenna relevant parameter from the N multi-antenna relevant parameters.

In an embodiment, when the first access detection uses the second multi-antenna relevant parameter, no channel occupancy time after the first time window is shared to a receiver of the first signal; and a time domain resource occupied by the first signal belongs to the first time window.

In an embodiment, when the first access detection does not use the second multi-antenna relevant parameter, channel occupancy time after the first time window is shared to a receiver of the first signal; and a time domain resource occupied by the first signal belongs to the first time window.

In a sub-embodiment of the foregoing embodiment, the first time window includes a time domain resource occupied by a signal sent by the receiver of the first signal to the first node; the time domain resource occupied by the signal sent by the receiver of the first signal to the first node does not exceed M multi-carrier symbols; and M is a positive integer.

In a sub-embodiment of the foregoing embodiment, a value of M is one of 1, 2, 4, 8, and 16.

In a sub-embodiment of the foregoing embodiment, the signal sent by the receiver of the first signal to the first node includes control information.

In a sub-embodiment of the foregoing embodiment, the signal sent by the receiver of the first signal to the first node includes Hybrid Automatic Repeat Request-ACKnowledgment (HARQ-ACK) information.

Embodiment 12

Figure 12:
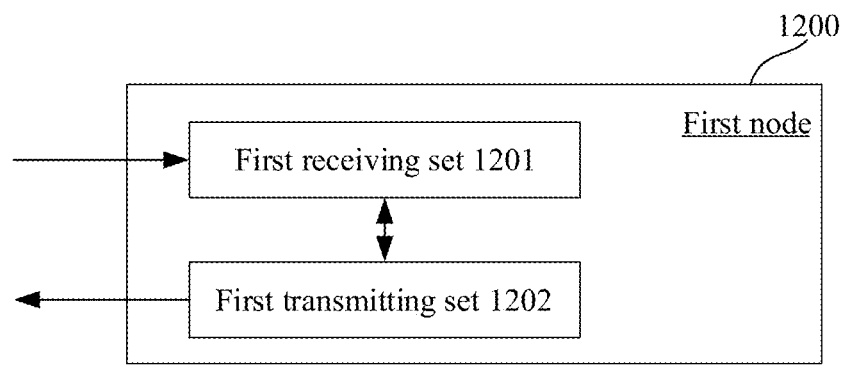
FIG. 12 is a structural block diagram of a processing apparatus used in a first node according to an embodiment of the present application.

Embodiment 12 illustrates a structural block diagram of a processing apparatus used in a first node, as shown in FIG. 12. In Embodiment 12, the first node 1200 includes a first receiving set 1201 and a first transmitting set 1202.

In an embodiment, the first receiving set 1201 includes at least one of the antenna 452, the transmitter/receiver 454, the multi-antenna receive processor 458, the receive processor 456, the controller/processor 459, the memory 460, and the data source 467 in FIG. 4 of the present application.

In an embodiment, the first transmitting set 1202 includes at least one of the antenna 420, the transmitter/receiver 418, the multi-antenna transmit processor 471, the transmit processor 416, the controller/processor 475, and the memory 476 in FIG. 4 of the present application.

In Embodiment 12, the first receiving set 1201 is configured to receive a first information block; the first information block is used to indicate a first time-frequency resource block; the first receiving set 1201 is configured to perform first access detection in a first sub-band; the first access detection includes more than one time of first type monitoring; the first transmitting set 1202 is configured to: send a first signal in the first time-frequency resource block when a quantity of times of the first type monitoring, in the first access detection, with monitoring results indicating that a channel is idle is not less than Q1; or abstain from sending of the first signal in the first time-frequency resource block when a quantity of times of the first type monitoring, in the first access detection, with monitoring results indicating that a channel is idle is less than Q1. An end time of the first access detection is not later than a start time of the first time-frequency resource block; the monitoring result of one time of the first type monitoring includes a channel being idle or a channel being busy; and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, the first node 1200 is user equipment.

In an embodiment, the first node 1200 is a relay node.

In an embodiment, the first node 1200 is a base station.

In an embodiment, the first node 1200 is a vehicle-mounted communications device.

In an embodiment, the first node 1200 is user equipment supporting V2X communication.

In an embodiment, the first node 1200 is a relay node supporting V2X communication.

In an embodiment, the first node 1200 is a base station device supporting IAB.

Embodiment 13

Figure 13:
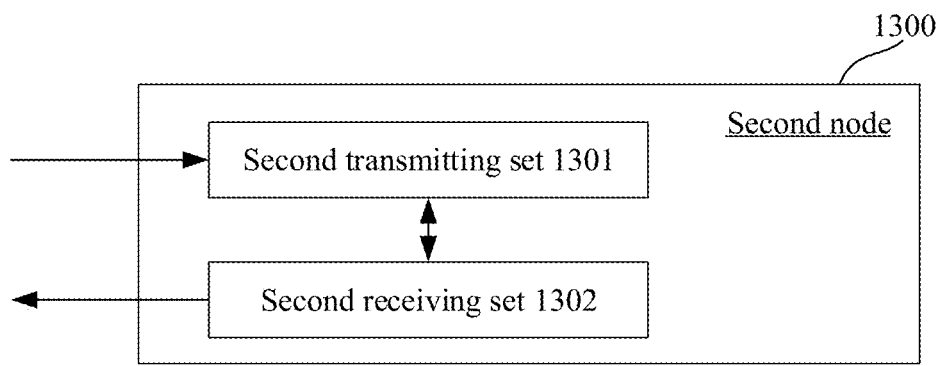
FIG. 13 is a structural block diagram of a processing apparatus used in a second node according to an embodiment of the present application.

Embodiment 13 illustrates a structural block diagram of a processing apparatus used in a first node, as shown in FIG. 13. In Embodiment 13, a second node 1300 includes a second transmitting set 1301 and a second receiving set 1302.

In an embodiment, the second transmitting set 1301 includes at least one of the antenna 420, the transmitter/receiver 418, the multi-antenna transmit processor 471, the transmit processor 416, the controller/processor 475, and the memory 476 in FIG. 4 of the present application.

In an embodiment, the second receiving set 1302 includes at least one of the antenna 452, the transmitter/receiver 454, the multi-antenna receive processor 458, the receive processor 456, the controller/processor 459, the memory 460, and the data source 467 in FIG. 4 of the present application.

In Embodiment 13, the second transmitting set 1301 is configured to send a first information block; the first information block is used to indicate a first time-frequency resource block; and the second receiving set 1302 is configured to monitor a first signal in the first time-frequency resource block. First access detection performed in a first sub-band is used to determine whether the first signal is sent. The first access detection includes more than one time of first type monitoring. The first signal is sent in the first time-frequency resource block when a quantity of times of the first type monitoring, in the first access detection, with monitoring results indicating that a channel is idle is not less than Q1; or the first signal is not sent in the first time-frequency resource block when a quantity of times of the first type monitoring, in the first access detection, with monitoring results indicating that a channel is idle is less than Q1. An end time of the first access detection is not later than a start time of the first time-frequency resource block, the monitoring result of one time of the first type monitoring includes a channel being idle or a channel being busy, and Q1 is a positive integer. The first access detection includes Q2 times of first type monitoring and Q3 times of first type monitoring, the Q2 times of first type monitoring are earlier than the Q3 times of first type monitoring in time domain, Q2 is a positive integer, and Q3 is a positive integer. A first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter. A quantity of times of the first type monitoring, in the Q2 times of first type monitoring, with monitoring results indicating that a channel is idle is less than Q1.

In an embodiment, the first power threshold is associated with the first multi-antenna relevant parameter and used to determine the monitoring results of the Q2 times of first type monitoring; a second power threshold is associated with the second multi-antenna relevant parameter and used to determine the monitoring results of the Q3 times of first type monitoring; and the second power threshold is not less than the first power threshold.

In an embodiment, the second multi-antenna relevant parameter is spatially associated with the first multi-antenna relevant parameter.

In an embodiment, a multi-antenna relevant parameter of the first signal is used to determine the second multi-antenna relevant parameter.

In an embodiment, a priority parameter of the first signal is used to determine Q1.

In an embodiment, the first signal includes a second information block; and the second information block is used to indicate that the second multi-antenna relevant parameter is used in the first access detection.

In an embodiment, the monitoring results of the Q3 times of first type monitoring are used to determine, from the first multi-antenna relevant parameter and the second multi-antenna relevant parameter, a multi-antenna relevant parameter for performing remaining times of first type monitoring, in the first access detection, other than the Q2 times of first type monitoring and the Q3 times of first type monitoring.

In an embodiment, the second node 1300 is user equipment.

In an embodiment, the second node 1300 is a relay node.

In an embodiment, the second node 1300 is a base station.

In an embodiment, the second node 1300 is a vehicle-mounted communications device.

In an embodiment, the second node 1300 is user equipment supporting V2X communication.

In an embodiment, the second node 1300 is a relay node supporting V2X communication.

In an embodiment, the second node 1300 is a base station device supporting IAB.

Those of ordinary skill in the art may understand that all or some of the steps in the foregoing method may be implemented by instructing relevant hardware through a program, and the program may be stored in a computer-readable storage medium, such as a read-only memory, a hard disk, or an optical disk. Optionally, all or some of the steps in the foregoing embodiments may alternatively be implemented by using one or more integrated circuits. Correspondingly, each module unit in the foregoing embodiments may be implemented in a form of hardware, or may be implemented in a form of a software function module, and the present application is not limited to any specific form of a combination of hardware and software. The first node in the present application includes, but is not limited to, wireless communications devices such as a mobile phone, a tablet computer, a notebook, a prepaid Internet card, a low-power device, an eMTC device, an NB-IoT device, an in-vehicle communications device, an aircraft, an airplane, an unmanned aerial vehicle, and a remote control airplane. The second node in the present application includes, but is not limited to, wireless communications devices such as a mobile phone, a tablet computer, a notebook, a prepaid Internet card, a low-power device, an eMTC device, an NB-IoT device, an in-vehicle communications device, an aircraft, an airplane, an unmanned aerial vehicle, and a remote control airplane. The user equipment, UE, or terminal in the present application includes but is not limited to wireless communications devices such as a mobile phone, a tablet computer, a notebook, a prepaid Internet card, a low-power device, an eMTC device, an NB-IoT device, an in-vehicle communications device, an aircraft, an airplane, an unmanned aerial vehicle, and a remote control airplane. The base station device, base station, or network side device in the present application includes, but is not limited to, wireless communications devices such as a macro cell base station, a micro cell base station, a home base station, a relay base station, an eNB, a gNB, a TRP, a GNSS, a relay satellite, a satellite base station, and an air base station.

The foregoing descriptions are merely preferred embodiments of the present application, rather than limiting the protection scope of the present application. Any modification, equivalent replacement, or improvement made without departing from the spirit and principle of the present application shall fall within the protection scope of the present application.

What is claimed is:

1. A first node used for wireless communication, comprising:
    a first receiver, configured to receive a first information block, wherein the first information block is used to indicate a first time-frequency resource block; and
    the first receiver is configured to perform first access detection in a first sub-band, wherein the first access detection comprises more than one time of first type monitoring; and
    a first transmitter, configured to: send a first signal in the first time-frequency resource block when a quantity of times of the first type monitoring, in the first access detection, with monitoring results indicating that a channel is idle is not less than Q1; or abstain from sending of a first signal in the first time-frequency resource block when a quantity of times of the first type monitoring, in the first access detection, with monitoring results indicating that a channel is idle is less than Q1,
    wherein an end time of the first access detection is not later than a start time of the first time-frequency resource block, the monitoring result of one time of the first type monitoring comprises a channel being idle or a channel being busy, and Q1 is a positive integer; the first access detection comprises Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1,
    wherein the first signal comprises a second information block, and the second information block is used to indicate that the second multi-antenna relevant parameter is used in the first access detection.

2. The first node according to claim 1, wherein a first power threshold is associated with the first multi-antenna relevant parameter and used to determine the monitoring results of the Q2 times of first type monitoring; a second power threshold is associated with the second multi-antenna relevant parameter and used to determine the monitoring results of the Q3 times of first type monitoring; and the second power threshold is not less than the first power threshold.

3. The first node according to claim 1, wherein the second multi-antenna relevant parameter is spatially associated with the first multi-antenna relevant parameter.

4. The first node according to claim 1, wherein a multi-antenna relevant parameter of the first signal is used to determine the second multi-antenna relevant parameter.

5. The first node according to claim 1, wherein a priority parameter of the first signal is used to determine Q1.

6. The first node according to claim 1, wherein the monitoring results of the Q3 times of first type monitoring are used to determine, from the first multi-antenna relevant parameter and the second multi-antenna relevant parameter, a multi-antenna relevant parameter for performing remaining first type monitoring, in the first access detection, other than the Q2 times of first type monitoring and the Q3 times of first type monitoring.

7. A second node used for wireless communication, comprising:
    a second transmitter, configured to send a first information block, wherein the first information block is used to indicate a first time-frequency resource block; and
    a second receiver, configured to monitor a first signal in the first time-frequency resource block, wherein first access detection performed in a first sub-band is used to determine whether the first signal is sent; the first access detection comprises more than one time of first type monitoring; the first signal is sent in the first time-frequency resource block when a quantity of times of the first type monitoring, in the first access detection, with monitoring results indicating that a channel is idle is not less than Q1; or the first signal is not sent in the first time-frequency resource block when a quantity of times of the first type monitoring, in the first access detection, with monitoring results indicating that a channel is idle is less than Q1; and
    an end time of the first access detection is not later than a start time of the first time-frequency resource block, the monitoring result of one time of the first type monitoring comprises a channel being idle or a channel being busy, and Q1 is a positive integer; the first access detection comprises Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1, wherein the first signal comprises a second information block, and the second information block is used to indicate that the second multi-antenna relevant parameter is used in the first access detection.

8. The second node according to claim 7, wherein a first power threshold is associated with the first multi-antenna relevant parameter and used to determine the monitoring results of the Q2 times of first type monitoring; a second power threshold is associated with the second multi-antenna relevant parameter and used to determine the monitoring results of the Q3 times of first type monitoring; and the second power threshold is not less than the first power threshold.

9. The second node according to claim 7, wherein the second multi-antenna relevant parameter is spatially associated with the first multi-antenna relevant parameter.

10. The second node according to claim 7, wherein a multi-antenna relevant parameter of the first signal is used to determine the second multi-antenna relevant parameter.

11. The second node according to claim 7, wherein a priority parameter of the first signal is used to determine Q1.

12. The second node according to claim 7, wherein the monitoring results of the Q3 times of first type monitoring are used to determine, from the first multi-antenna relevant parameter and the second multi-antenna relevant parameter, a multi-antenna relevant parameter for performing remaining first type monitoring, in the first access detection, other than the Q2 times of first type monitoring and the Q3 times of first type monitoring.

13. A method for a first node used for wireless communication, comprising:
receiving a first information block, wherein the first information block is used to indicate a first time-frequency resource block;
performing first access detection in a first sub-band, wherein the first access detection comprises more than one time of first type monitoring; and
sending a first signal in the first time-frequency resource block when a quantity of times of the first type monitoring, in the first access detection, with monitoring results indicating that a channel is idle is not less than Q1; or abstaining from sending of a first signal in the first time-frequency resource block when a quantity of times of the first type monitoring, in the first access detection, with monitoring results indicating that a channel is idle is less than Q1, wherein an end time of the first access detection is not later than a start time of the first time-frequency resource block, the monitoring result of one time of the first type monitoring comprises a channel being idle or a channel being busy, and Q1 is a positive integer; the first access detection comprises Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1, wherein the first signal comprises a second information block, and the second information block is used to indicate that the second multi-antenna relevant parameter is used in the first access detection.

14. The method according to claim 13, wherein a first power threshold is associated with the first multi-antenna relevant parameter and used to determine the monitoring results of the Q2 times of first type monitoring; a second power threshold is associated with the second multi-antenna relevant parameter and used to determine the monitoring results of the Q3 times of first type monitoring; and the second power threshold is not less than the first power threshold.

15. The method according to claim 13, wherein the second multi-antenna relevant parameter is spatially associated with the first multi-antenna relevant parameter.

16. A method for a second node used for wireless communication, comprising:
sending a first information block, wherein the first information block is used to indicate a first time-frequency resource block; and
monitoring a first signal in the first time-frequency resource block, wherein first access detection performed in a first sub-band is used to determine whether the first signal is sent; the first access detection comprises more than one time of first type monitoring; the first signal is sent in the first time-frequency resource block when a quantity of times of the first type monitoring, in the first access detection, with monitoring results indicating that a channel is idle is not less than Q1; or the first signal is not sent in the first time-frequency resource block when a quantity of times of the first type monitoring, in the first access detection, with monitoring results indicating that a channel is idle is less than Q1; and
an end time of the first access detection is not later than a start time of the first time-frequency resource block, the monitoring result of one time of the first type monitoring comprises a channel being idle or a channel being busy, and Q1 is a positive integer; the first access detection comprises Q2 times of first type monitoring and Q3 times of first type monitoring, the Q2 times of first type monitoring are earlier than the Q3 times of first type monitoring in time domain, Q2 is a positive integer, and Q3 is a positive integer; a first multi-antenna relevant parameter is used in the Q2 times of first type monitoring, a second multi-antenna relevant parameter is used in the Q3 times of first type monitoring, and the second multi-antenna relevant parameter is different from the first multi-antenna relevant parameter; and a quantity of times of the first type monitoring, in the Q2 times of first type monitoring, with monitoring results indicating that a channel is idle is less than Q1,
wherein the first signal comprises a second information block, and the second information block is used to indicate that the second multi-antenna relevant parameter is used in the first access detection.

17. The method according to claim 16, wherein a first power threshold is associated with the first multi-antenna relevant parameter and used to determine the monitoring results of the Q2 times of first type monitoring; a second power threshold is associated with the second multi-antenna relevant parameter and used to determine the monitoring results of the Q3 times of first type monitoring; and the second power threshold is not less than the first power threshold.

18. The method according to claim 16, wherein the second multi-antenna relevant parameter is spatially associated with the first multi-antenna relevant parameter.

* * * * *